(12) United States Patent
Cheng et al.

(10) Patent No.: US 9,872,193 B2
(45) Date of Patent: Jan. 16, 2018

(54) CSI REPORTING FOR LTE-TDD EIMTA

(71) Applicant: QUALCOMM Incorporated, San Diego, CA (US)

(72) Inventors: Peng Cheng, Beijing (CN); Neng Wang, Beijing (CN); Chao Wei, Beijing (CN); Wanshi Chen, San Diego, CA (US); Peter Gaal, San Diego, CA (US); Hao Xu, San Diego, CA (US); Jilei Hou, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/913,889

(22) PCT Filed: Sep. 22, 2014

(86) PCT No.: PCT/CN2014/087054
§ 371 (c)(1),
(2) Date: Feb. 23, 2016

(87) PCT Pub. No.: WO2015/043427
PCT Pub. Date: Apr. 2, 2015

(65) Prior Publication Data
US 2016/0205579 A1 Jul. 14, 2016

(30) Foreign Application Priority Data

Sep. 27, 2013 (WO) ............... PCT/CN2013/084454

(51) Int. Cl.
*H04W 24/10* (2009.01)
*H04L 5/14* (2006.01)
(Continued)

(52) U.S. Cl.
CPC ........... *H04W 24/10* (2013.01); *H04L 5/0057* (2013.01); *H04L 5/14* (2013.01); *H04L 5/1469* (2013.01);
(Continued)

(58) Field of Classification Search
CPC ..... H04W 24/10; H04W 5/14; H04W 5/0057; H04W 72/0413; H04W 72/042; H04W 76/046; H04W 88/02; H04L 29/08018
See application file for complete search history.

(56) References Cited

U.S. PATENT DOCUMENTS 8,571,067 B2 * 10/2013 Guo ..................... H04L 1/0026
370/332
8,929,235 B2 * 1/2015 Baldemair ............ H04W 24/10
370/252
(Continued)

FOREIGN PATENT DOCUMENTS

CN 102026209 A 4/2011
CN 102281638 A 12/2011
(Continued)

OTHER PUBLICATIONS

ISA/CN, International Search Report and Written Opinion of the International Searching Authority, Int'l App. No. PCT/US2013/084454, dated Jun. 25, 2014, State Intellectual Property Office of the P.R. China, Beijing, CN, 14 pgs.
(Continued)

*Primary Examiner* — Warner Wong
(74) *Attorney, Agent, or Firm* — Holland & Hart LLP

(57) ABSTRACT

Methods, systems, and devices are described for providing periodic CSI reports and/or aperiodic CSI reports to provide CSI for both anchor and non-anchor TDD subframes in eIMTA. Periodic CSI reports may be provided based on a reference configuration, and aperiodic CSI reports may be
(Continued)

provided based on a time of reception of a CSI request and a reference configuration. A UE may determine to report anchor or non-anchor CSI through explicit or implicit signaling. Aperiodic CSI may be used for transmission of anchor subframe CSI reports and periodic CSI may be used for transmission of non-anchor subframe CSI reports, or aperiodic CSI may be used for transmission of non-anchor subframe CSI reports and periodic CSI may be used for transmission of anchor subframe CSI reports. A determination of the reference subframe for aperiodic CSI estimation may be based on a time of receipt of an aperiodic CSI request.

30 Claims, 17 Drawing Sheets

(51) Int. Cl.
| | | |
|---|---|---|
| *H04L 29/08* | (2006.01) | |
| *H04W 72/04* | (2009.01) | |
| *H04W 76/04* | (2009.01) | |
| *H04W 88/02* | (2009.01) | |
| *H04W 88/08* | (2009.01) | |
| *H04L 5/00* | (2006.01) | |

(52) U.S. Cl.
CPC ..... *H04L 29/08018* (2013.01); *H04W 72/042* (2013.01); *H04W 72/0413* (2013.01); *H04W 76/046* (2013.01); *H04L 5/0007* (2013.01); *H04W 72/0446* (2013.01); *H04W 88/02* (2013.01); *H04W 88/08* (2013.01)

(56) References Cited

U.S. PATENT DOCUMENTS

| | | | | |
|---|---|---|---|---|
| 9,107,211 | B2 * | 8/2015 | Seo | H04L 1/0026 |
| 9,634,752 | B2 * | 4/2017 | Lee | H04B 7/0626 |
| 2011/0211503 | A1 | 9/2011 | Che et al. | |
| 2012/0076040 | A1 * | 3/2012 | Hoshino | H04W 24/10 370/252 |
| 2012/0106388 | A1 * | 5/2012 | Shimezawa | H04B 7/024 370/252 |
| 2012/0196607 | A1 * | 8/2012 | Samardzija | H04J 11/0053 455/450 |
| 2012/0328035 | A1 * | 12/2012 | Yoon | H04B 7/0626 375/260 |
| 2013/0102304 | A1 | 4/2013 | Lee et al. | |
| 2013/0114554 | A1 * | 5/2013 | Yang | H04W 24/10 370/329 |
| 2013/0258964 | A1 * | 10/2013 | Nam | H04W 72/046 370/329 |
| 2013/0294268 | A1 * | 11/2013 | Xu | H04W 72/082 370/252 |
| 2013/0301548 | A1 * | 11/2013 | Etemad | H04W 76/048 370/329 |
| 2013/0322273 | A1 | 12/2013 | Etemad et al. | |
| 2015/0029910 | A1 * | 1/2015 | He | H04W 76/02 370/280 |
| 2015/0085750 | A1 * | 3/2015 | Zhang | H04L 1/0031 370/328 |
| 2015/0229446 | A1 * | 8/2015 | Feng | H04L 1/1621 370/294 |
| 2016/0119099 | A1 * | 4/2016 | Kim | H04L 5/0048 370/329 |
| 2017/0142715 | A1 * | 5/2017 | Li | H04W 72/0446 |

FOREIGN PATENT DOCUMENTS

| | | |
|---|---|---|
| CN | 102740477 A | 10/2012 |
| CN | 102804895 A | 11/2012 |
| EP | 2595333 A2 | 5/2013 |

OTHER PUBLICATIONS

ISA/CN, International Search Report and Written Opinion of the International Searching Authority, Int'l App. No. PCT/US2014/087054, dated Dec. 31, 2014, State Intellectual Property Office of the P.R. China, Beijing, CN, 13 pgs.

HTC, "On Aperiodic CSI Reporting in TDD eIMTA Systems," 3GPP TSG RAN WG1 Meeting #74, R1-133251, Barcelona, Spain, Aug. 19-23, 2013, 3 pgs., XP050716409, 3rd Generation Partnership Project.

Qualcomm Incorporated, "CSI Measurement for eIMTA," 3GPP TSG RAN WG1 Meeting #74, R1-133580, Barcelona, Spain, Aug. 19-23, 2013, 4 pgs., XP050716672, 3rd Generation Partnership Project.

Renesas Mobile Europe Ltd, "CSI Measurement and Reporting in TDD eIMTA," 3GPP TSG RAN WG1 Meeting #74, R1-133237, Barcelona, Spain, Aug. 19-23, 2013, 3 pgs., XP050716053, 3rd Generation Partnership Project.

EPO, Supplementary European Search Report, EP App. No. 14848308, dated Apr. 20, 2017, European Patent Office, Munich, DE, 9 pgs.

* cited by examiner

Uplink-downlink configurations.

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

200

CSI REPORTING FOR LTE-TDD EIMTA

CROSS REFERENCES

The present Application for Patent is a 371 national phase of International Patent Application No. PCT/CN2014/087054 by Qualcomm Incorporated et al., entitled "CSI Reporting for LTE-TDD eIMTA," filed Sep. 22, 2014; which claims priority to International Patent Application No. PCT/CN2013/084454 by Qualcomm Incorporated et al., entitled "CSI Reporting for LTE-TDD eIMTA," filed Sep. 27, 2013; each of which is assigned to the assignee hereof, and expressly incorporated by reference herein.

FIELD OF THE DISCLOSURE

The present disclosure, for example, relates to wireless communication systems, and more particularly to techniques for determining and/or providing channel conditions, such as channel state information.

BACKGROUND

The following relates generally to wireless communication, and more specifically to reporting of channel state information in based on time division duplex signal transmission configurations. Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems. Additionally, some systems may operate using time-division duplex (TDD), in which a single carrier frequency is used for both uplink and downlink communications, and some systems may operate using frequency-division duplex (FDD), in which separate carrier frequencies are used for uplink and downlink communications.

In systems that operate using TDD, different formats may be used in which uplink and downlink communications may be asymmetric. TDD formats include transmission of frames of data, each including a number of different subframes in which different subframes may be uplink or downlink subframes. Reconfiguration of TDD formats may be implemented based on data traffic patterns of the particular system, in order to provide additional uplink or downlink data capacity to users of the system.

SUMMARY

The described features generally relate to improved systems, methods, and/or apparatuses for determination of channel state information (CSI) in TDD communications. In some examples, a user equipment (UE) may be configured to provide periodic CSI reports and/or aperiodic CSI reports to provide CSI for both anchor and non-anchor TDD subframes. Periodic CSI reports may be provided based on, for example, a reference configuration, and aperiodic CSI reports may be provided based on a timeline that is based on a time of reception of a CSI request and a reference configuration. In some examples, a UE may determine to report anchor or non-anchor CSI through explicit or implicit signaling. In some examples, aperiodic CSI may be used for transmission of anchor subframe CSI reports, and periodic CSI may be used for transmission of non-anchor subframe CSI reports. In other examples, aperiodic CSI may be used for transmission of non-anchor subframe CSI reports, and periodic CSI may be used for transmission of anchor subframe CSI reports. A determination of the reference subframe for aperiodic CSI estimation may be based on a time of receipt of an aperiodic CSI request. In some examples, periodic CSI may be performed according to a timeline that is defined by a reference TDD uplink/downlink (UL/DL) configuration. In further examples, periodic and aperiodic CSI reports may be transmitted in a single identified uplink subframe through multiplexing of the CSI reports using a physical uplink shared channel (PUSCH).

According to aspects of the disclosure, a method of wireless communication performed by a UE in time-division duplex (TDD) communication with a base station is provided. The method generally includes receiving a CSI request from the base station, determining that CSI is to be estimated for an anchor reference TDD subframe or a non-anchor reference TDD subframe responsive to receiving the CSI request, estimating anchor CSI for the anchor reference TDD subframe or non-anchor CSI for the non-anchor reference TDD subframe, and transmitting at least a portion of the anchor CSI or non-anchor CSI in an identified uplink subframe, the identified uplink subframe determined based at least in part on a time of receipt of the CSI request. The identified uplink subframe may be determined, for example, based on a reference TDD UL/DL configuration that is different than a current configured TDD UL/DL configuration of the UE.

According to some examples, the transmitting may include transmitting the anchor CSI in a periodic CSI report and transmitting the non-anchor CSI in an aperiodic CSI report. Likewise, the transmitting may include transmitting the non-anchor CSI in a periodic CSI report, and transmitting the anchor CSI in an aperiodic CSI report. In some examples, the transmitting may include transmitting both non-anchor CSI and anchor CSI in aperiodic CSI reports. The periodic CSI report may, in some examples, be transmitted in a fixed uplink subframe determined by a reference TDD UL/DL configuration, and the reference TDD UL/DL configuration may be received via one or more of Layer 1 (L1), Medium Access Control (MAC), or Radio Resource Control (RRC) signaling.

In some examples, the method may also include determining that an uplink subframe for reporting the periodic CSI report and aperiodic CSI report correspond to the same uplink subframe, and multiplexing the periodic CSI report and aperiodic CSI report in the same uplink subframe. Additionally or alternatively, the method may also include determining that an uplink subframe for reporting the periodic CSI report and aperiodic CSI report correspond to the same uplink subframe, and transmitting the aperiodic CSI report in the same uplink subframe. In some examples, the non-anchor reference subframe may be determined based on a downlink trigger subframe containing the CSI request and a closest subsequent non-anchor downlink subframe that is at least k subframes after the trigger subframe, in which k is greater than or equal to zero. In some examples, the UE may receive signaling from the base station indicating that the anchor CSI and/or non-anchor CSI are to be transmitted, the signaling received via one or more of Layer 1 (L1) signaling, Medium Access Control (MAC) signaling, or Radio Resource Control (RRC) signaling. The signaling, in some examples, may include an eIMTA CSI type field received via L1 signaling, or a two-bit CSI request field received in a downlink control information (DCI) transmission.

According to some examples, the anchor or non-anchor CSI may be determined based on a current frame index, in which the anchor CSI and the non-anchor CSI may be reported in alternating frames, for example. In examples, the identified uplink subframe may be determined based on a reference TDD UL/DL configuration of the UE. The identified non-anchor reference TDD subframe maybe determined, for example, based on a downlink trigger subframe containing the CSI request and closest subsequent non-anchor uplink subframe that is at least k subframes after the downlink trigger subframe. For example, k may be greater than or equal to zero.

In another aspect, a UE apparatus configured for time-division duplex (TDD) wireless communication with a base station is provided. The apparatus may include at least one processor and a memory coupled with the at least one processor. The processor may be configured to receive a CSI request from the base station, determine that CSI is to be estimated for an anchor reference TDD subframe or a non-anchor reference TDD subframe responsive to receiving the CSI request, estimate anchor CSI for the anchor reference TDD subframe and/or non-anchor CSI for the non-anchor reference TDD subframe, and transmit at least a portion of the anchor CSI and/or non-anchor CSI in one or more identified uplink subframes, the one or more identified uplink subframes determined based at least in part on a time of receipt of the at least one CSI request. The identified uplink subframe may be determined, for example, based on a reference TDD UL/DL configuration that is different than a current configured TDD UL/DL configuration of the UE. The processor may be configured, in some examples, to transmit the anchor CSI in a periodic CSI report, and transmit the non-anchor CSI in an aperiodic CSI report. In other examples, the processor may be configured to transmit the non-anchor CSI in a periodic CSI report, and transmit the anchor CSI in an aperiodic CSI report. In still other examples, the at least one processor may be configured to transmit both non-anchor CSI and anchor CSI in aperiodic CSI reports.

The periodic CSI report, in some examples, may be transmitted in a fixed uplink subframe determined by a reference TDD UL/DL configuration. In other examples, the at least one processor may be configured to determine that an uplink subframe for reporting each of the periodic CSI report and aperiodic CSI report correspond to the same uplink subframe, and multiplex the periodic CSI report and aperiodic CSI report in the same uplink subframe. The non-anchor reference subframe, according to some examples, may be determined based on a downlink trigger subframe containing the CSI request and a closest subsequent non-anchor downlink subframe following the trigger subframe. In some examples, the anchor or non-anchor CSI may be determined based on a current frame index, and, for example, the anchor CSI and the non-anchor CSI may be reported in alternating frames.

According to some aspects, a UE apparatus configured for TDD wireless communication with a base station is disclosed. The apparatus may include means for receiving a CSI request from the base station, means for determining that CSI is to be estimated for one or more of an anchor reference TDD subframe or a non-anchor reference TDD subframe responsive to receiving the CSI request, means for estimating one or more of anchor CSI for the anchor reference TDD subframe or non-anchor CSI for the non-anchor reference TDD subframe, and means for transmitting at least a portion of the anchor CSI or non-anchor CSI in one or more identified uplink subframes, the one or more identified uplink subframes determined based at least in part on a time of receipt of the at least one CSI request.

In other aspects, a computer program product for TDD wireless communication by a UE is disclosed. The computer program apparatus may include a non-transitory computer-readable medium comprising code for receiving at least one CSI request from the base station, determining that CSI is to be estimated for one or more of an anchor reference TDD subframe or a non-anchor reference TDD subframe responsive to receiving the CSI request, estimating one or more of anchor CSI for the anchor reference TDD subframe or non-anchor CSI for the non-anchor reference TDD subframe, and transmitting at least a portion of the anchor CSI or non-anchor CSI in one or more identified uplink subframes, the one or more identified uplink subframes determined based at least in part on a time of receipt of the at least one CSI request.

In other aspects, a method of wireless communication performed by a UE in TDD communication with a base station is disclosed. The method may include receiving a CSI request from the base station, determining that CSI is to be estimated for one or more of an anchor reference TDD subframe or a non-anchor reference TDD subframe responsive to receiving the CSI request, estimating one or more of anchor CSI for the anchor reference TDD subframe or non-anchor CSI for the non-anchor reference TDD subframe, and transmitting at least a portion of the anchor and non-anchor CSI in an aperiodic CSI report transmitted in an identified uplink subframe, the identified uplink subframe determined based at least in part on a time of receipt of the at least one CSI request. The transmitting may include, for example, multiplexing the anchor CSI and non-anchor CSI in the aperiodic CSI report. The non-anchor reference subframe may be determined, for example, based on a downlink trigger subframe containing the at least one CSI request and closest subsequent non-anchor downlink subframe that is at least k subframes after the trigger subframe, and k may be greater than or equal to zero. In some examples, the identified subframe may be determined based on a reference TDD UL/DL configuration that is different than a current TDD UL/DL configuration of the UE.

In other aspects a UE apparatus configured for TDD wireless communication with a base station is disclosed. The apparatus may include at least one processor and a memory coupled with the processor. The at least one processor may be configured to receive a CSI request from the base station, determine that CSI is to be estimated for one or more of an anchor reference TDD subframe or a non-anchor reference TDD subframe responsive to receiving the CSI request, estimate one or more of anchor CSI for the anchor reference TDD subframe or non-anchor CSI for the non-anchor reference TDD subframe, and transmit at least a portion of the anchor and non-anchor CSI in an aperiodic CSI report transmitted in an identified uplink subframe, the identified uplink subframe determined based at least in part on a time of receipt of the at least one CSI request.

In further aspects a wireless communication a UE apparatus for TDD communication with a base station is disclosed. The apparatus may include means for receiving a CSI request from the base station, means for determining that CSI is to be estimated for one or more of an anchor reference TDD subframe or a non-anchor reference TDD subframe responsive to receiving the CSI request, means for estimating one or more of anchor CSI for the anchor reference TDD subframe or non-anchor CSI for the non-anchor reference TDD subframe, and means for transmitting at least a portion of the anchor and non-anchor CSI in an aperiodic CSI report transmitted in an identified uplink subframe, the identified uplink subframe determined based at least in part on a time of receipt of the at least one CSI request.

In still other aspects, a computer program product for TDD wireless communication by a UE is disclosed. The computer program product may include a non-transitory computer-readable medium comprising code for receiving a CSI request from the base station, determining that CSI is to be estimated for one or more of an anchor reference TDD subframe or a non-anchor reference TDD subframe responsive to receiving the CSI request, estimating one or more of anchor CSI for the anchor reference TDD subframe or non-anchor CSI for the non-anchor reference TDD subframe, and transmitting at least a portion of the anchor and non-anchor CSI in an aperiodic CSI report transmitted in an identified uplink subframe, the identified uplink subframe determined based at least in part on a time of receipt of the at least one CSI request.

In other aspects, a method of wireless communication performed by a UE in TDD communication with a base station is disclosed. The method may include determining a reference TDD UL/DL configuration, identifying a reference subframe for estimating CSI, the reference subframe identified based on a current configured TDD UL/DL subframe configuration of the UE, estimating CSI for the reference subframe, and transmitting at least a portion of the estimated CSI in a periodic uplink subframe, the periodic uplink subframe determined based on the reference TDD UL/DL configuration. In some examples, the reference TDD UL/DL configuration is a fixed configuration irrespective of one or more reconfiguration of the UE TDD UL/DL configuration. The reference TDD UL/DL configuration may be, for example, a semi-static reference configuration indicated to the UE by the base station through, for example, one or more of Level 1 (L1) signaling, radio resource control (RRC) signaling, or medium access control (MAC) signaling.

In still further aspects, a UE apparatus for TDD wireless communication with a base station is disclosed. The apparatus may include means for determining a reference TDD UL/DL configuration, means for identifying a reference subframe for estimating CSI, the reference subframe identified based on a current configured TDD UL/DL subframe configuration of the UE, means for estimating CSI for the reference subframe, and means for transmitting at least a portion of the estimated CSI in a periodic uplink subframe, the periodic uplink subframe determined based on the reference TDD UL/DL configuration. The reference TDD UL/DL configuration, for example, may be a fixed configuration irrespective of one or more reconfiguration of the UE TDD UL/DL configuration, and may be a semi-static reference configuration indicated to the UE by the base station.

In still further aspects, another UE apparatus configured for TDD wireless communication with a base station is disclosed. The apparatus may include at least one processor and a memory coupled with the processor. The at least one processor may be configured to determine a reference TDD UL/DL configuration, identify a reference subframe for estimating CSI, the reference subframe identified based on a current configured TDD UL/DL subframe configuration of the UE, estimate CSI for the reference subframe, and transmit at least a portion of the estimated CSI in a periodic uplink subframe, the periodic uplink subframe determined based on the reference TDD UL/DL configuration.

In still further aspects, a computer program product for TDD wireless communication by a user equipment UE is disclosed. The computer program product may include a non-transitory computer-readable medium comprising code for determining a reference TDD UL/DL configuration, identifying a reference subframe for estimating CSI, the reference subframe identified based on a current configured TDD UL/DL subframe configuration of the UE, estimating CSI for the reference subframe, and transmitting at least a portion of the estimated CSI in a periodic uplink subframe, the periodic uplink subframe determined based on the reference TDD UL/DL configuration. The reference TDD UL/DL configuration may be, for example, a fixed configuration irrespective of one or more reconfiguration of the UE TDD UL/DL configuration, and may be a semi-static reference configuration indicated to the UE by the base station.

Further scope of the applicability of the described methods and apparatuses will become apparent from the following detailed description, claims, and drawings. The detailed description and specific examples are given by way of illustration only, since various changes and modifications within the spirit and scope of the description will become apparent to those skilled in the art.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
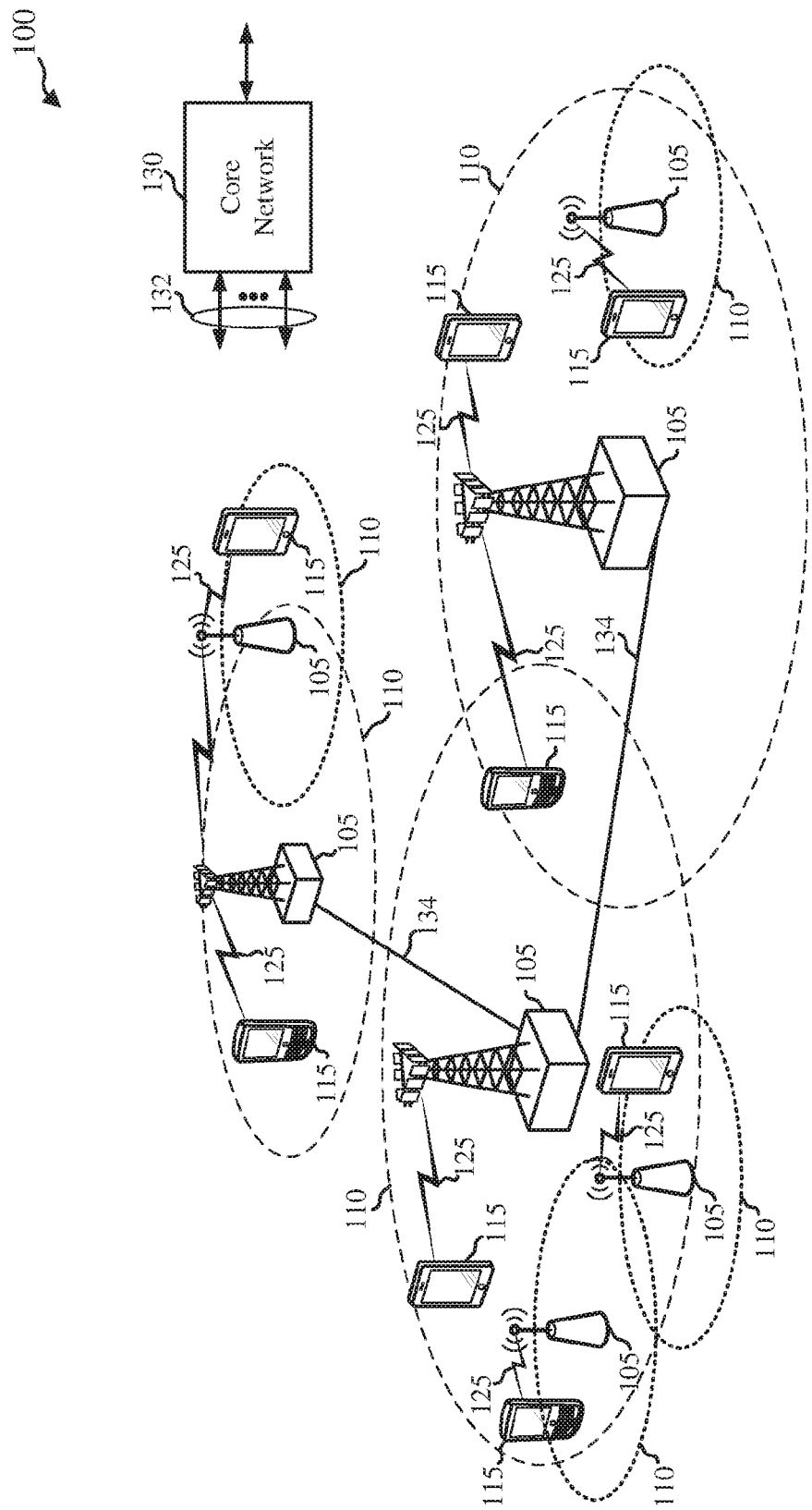
FIG. 1 is a diagram illustrating an example of a wireless communications system in accordance with various examples.

Various aspects of the disclosure provide for determination of CSI in systems that provide for dynamic reconfiguration of a TDD UL/DL configuration. In some examples, a UE may be configured to provide periodic CSI reports and/or aperiodic CSI reports to provide CSI for both anchor and non-anchor TDD subframes. CSI information may be used to provide channel properties of a communication link related to signal propagation between the UE and base station and represents the combined effect of, for example, scattering, fading, and power decay with distance. The CSI information may be used to adapt transmissions to current channel conditions.

According to various examples periodic CSI reports may be provided based on a reference configuration, and aperiodic CSI reports may be provided based on a timeline that is derived from a time of reception of a CSI request and a reference subframe during which CSI is estimated. In some examples, aperiodic CSI may be used for transmission of anchor subframe CSI reports, and periodic CSI may be used for transmission of non-anchor subframe CSI reports. In other examples, aperiodic CSI may be used for transmission of non-anchor subframe CSI reports, and periodic CSI may be used for transmission of anchor subframe CSI reports. A determination of the reference subframe for aperiodic CSI estimation may be based on a time of receipt of an aperiodic CSI request. In some examples, periodic CSI may be performed according to a timeline that is defined by a reference TDD UL/DL configuration. In further examples, periodic and aperiodic CSI reports may be transmitted in a single identified uplink subframe through multiplexing of the CSI reports using a physical uplink shared channel (PUSCH).

According to various aspects of the disclosure, periodic CSI reporting may be provided using a DL reference configuration timeline, so that the CSI is reported in fixed uplink subframes. The reference configuration may be fixed or semi-static, thereby providing CSI reporting that may accommodate a number of TDD UL/DL configurations and reconfigurations. Aperiodic CSI reporting, according to various aspects, may be provided using a UL reference configuration timeline, so that the CSI request may be sent in fixed downlink subframes. CSI reporting for anchor and non-anchor subframes may be accommodated through multiplexing of CSI information and/or providing separate periodic and aperiodic CSI reporting according to one or more reporting timelines.

Techniques described herein may be used for various wireless communications systems such as cellular wireless systems, Peer-to-Peer wireless communications, wireless local access networks (WLANs), ad hoc networks, satellite communications systems, and other systems. The terms "system" and "network" are often used interchangeably. These wireless communications systems may employ a variety of radio communication technologies such as Code Division Multiple Access (CDMA), Time Division Multiple Access (TDMA), Frequency Division Multiple Access (FDMA), Orthogonal FDMA (OFDMA), Single-Carrier FDMA (SC-FDMA), and/or other radio technologies. Generally, wireless communications are conducted according to a standardized implementation of one or more radio communication technologies called a Radio Access Technology (RAT). A wireless communications system or network that implements a Radio Access Technology may be called a Radio Access Network (RAN).

Examples of Radio Access Technologies employing CDMA techniques include CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. Examples of TDMA systems include various implementations of Global System for Mobile Communications (GSM). Examples of Radio Access Technologies employing OFDM and/or OFDMA include Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunication System (UNITS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies.

Thus, the following description provides examples, and is not limiting of the scope, applicability, or configuration set forth in the claims. Changes may be made in the function and arrangement of elements discussed without departing from the spirit and scope of the disclosure. Various examples may omit, substitute, or add various procedures or components as appropriate. For instance, the methods described may be performed in an order different from that described, and various steps may be added, omitted, or combined. Also, features described with respect to certain examples may be combined in other examples.

Referring first to FIG. 1, a diagram illustrates an example of a wireless communications system 100. The wireless communications system 100 includes base stations (or cells) 105, user equipment (UEs) 115, and a core network 130. The base stations 105 may communicate with the UEs 115 under the control of a base station controller (not shown), which may be part of the core network 130 or the base stations 105 in various examples. Base stations 105 may communicate control information and/or user data with the core network 130 through backhaul links 132. Backhaul links 132 may be wired backhaul links (e.g., copper, fiber, etc.) and/or wireless backhaul links (e.g., microwave, etc.). In examples, the base stations 105 may communicate, either directly or indirectly, with each other over backhaul links 134, which may be wired or wireless communication links. The wireless communications system 100 may support operation on multiple carriers (waveform signals of different frequencies). Multi-carrier transmitters can transmit modulated signals simultaneously on the multiple carriers. For example, each communication link 125 may be a multi-carrier signal modulated according to the various radio technologies described above. Each modulated signal may be sent on a different carrier and may carry control information (e.g., reference signals, control channels, etc.), overhead information, data, etc.

The base stations 105 may wirelessly communicate with the UEs 115 via one or more base station antennas. Each of the base station 105 sites may provide communication coverage for a respective geographic coverage area 110. In some examples, base stations 105 may be referred to as a base transceiver station, a radio base station, an access point, a radio transceiver, a basic service set (BSS), an extended service set (ESS), a NodeB, eNodeB (eNB), Home NodeB, a Home eNodeB, or some other suitable terminology. The geographic coverage area 110 for a base station may be divided into sectors corresponding to portions of the coverage area (not shown). The wireless communications system 100 may include base stations 105 of different types (e.g., macro, micro, and/or pico base stations). There may be overlapping coverage areas for different technologies.

The wireless communications system 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. In examples, some base stations 105 may be synchronous while other base stations may be asynchronous.

The UEs 115 are dispersed throughout the wireless communications system 100, and each device may be stationary or mobile. A UE 115 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a user equipment, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, or the like. A communication device may be able to communicate with macro base stations, pico base stations, femto base stations, relay base stations, and the like.

The communication links 125 shown in the wireless communications system 100 may include uplink (UL) transmissions from a UE 115 to a base station 105, and/or downlink (DL) transmissions, from a base station 105 to a UE 115. The downlink transmissions may also be called forward link transmissions while the uplink transmissions may also be called reverse link transmissions. In examples, the communication links 125 are TDD carriers carrying bidirectional traffic within traffic frames.

In examples, the wireless communications system 100 is an LTE/LTE-A network. In LTE/LTE-A networks, the term evolved Node B (eNB) may be generally used to describe the base stations 105. The wireless communications system 100 may be a Heterogeneous LTE/LTE-A network in which different types of eNBs provide coverage for various geographical regions. For example, each eNB may provide communication coverage for a macro cell, a pico cell, a femto cell, and/or other types of cell. A macro cell generally covers a relatively large geographic area (e.g., several kilometers in radius) and may allow unrestricted access by UEs with service subscriptions with the network provider. A pico cell would generally cover a relatively smaller geographic area and may allow unrestricted access by UEs with service subscriptions with the network provider. A femto cell would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). An eNB for a macro cell may be referred to as a macro eNB. An eNB for a pico cell may be referred to as a pico eNB. And, an eNB for a femto cell may be referred to as a femto eNB or a home eNB. An eNB may support one or multiple (e.g., two, three, four, and the like) cells.

The wireless communications system 100 according to an LTE/LTE-A network architecture may be referred to as an Evolved Packet System (EPS). The EPS may include one or more UEs 115, an Evolved UMTS Terrestrial Radio Access Network (E-UTRAN), an Evolved Packet Core (EPC) (e.g., core network 130), a Home Subscriber Server (HSS), and an Operator's IP Services. The EPS may interconnect with other access networks using other Radio Access Technologies. For example, EPS may interconnect with a UTRAN-based network and/or a CDMA-based network via one or more Serving GPRS Support Nodes (SGSNs). To support mobility of UEs 115 and/or load balancing, the EPS may support dynamic TDD reconfiguration of one or more UEs 115, as will be discussed in more detail below.

The E-UTRAN may include the base stations 105 and may provide user plane and control plane protocol terminations toward the UEs 115. The base stations 105 may be connected to other base stations 105 via backhaul link 134 (e.g., an X2 interface). The base stations 105 may provide an access point to the EPC for the UEs 115. The base stations 105 may be connected by backhaul link 132 (e.g., an S1 interface) to the EPC. Logical nodes within the EPC may include one or more Mobility Management Entities (MMEs), one or more Serving Gateways, and one or more Packet Data Network (PDN) Gateways (not shown). Generally, the MME may provide bearer and connection management. All user IP packets may be transferred through the Serving Gateway, which itself may be connected to the PDN Gateway. The PDN Gateway may provide UE IP address allocation as well as other functions. The PDN Gateway may be connected to IP networks and/or the operator's IP Services. These logical nodes may be implemented in separate physical nodes or one or more may be combined in a single physical node. The IP Networks/Operator's IP Services may include the Internet, an Intranet, an IP Multimedia Subsystem (IMS), and/or a Packet-Switched (PS) Streaming Service (PSS).

The UEs 115 may be configured to collaboratively communicate with multiple base stations 105 through, for example, Multiple Input Multiple Output (MIMO), Coordinated Multi-Point (CoMP), or other schemes. MIMO techniques use multiple antennas on the base stations and/or multiple antennas on the UE to take advantage of multipath environments to transmit multiple data streams. CoMP includes techniques for dynamic coordination of transmission and reception by a number of eNBs to improve overall transmission quality for UEs as well as increasing network and spectrum utilization. Generally, CoMP techniques utilize backhaul links 132 and/or 134 for communication between base stations 105 to coordinate control plane and user plane communications for the UEs 115.

The communication networks that may accommodate some of the various disclosed examples may be packet-based networks that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use Hybrid ARQ (HARM) to provide retransmission at the MAC layer to improve link efficiency. In the control plane, the Radio Resource Control (RRC) protocol layer may provide establishment, configuration, and maintenance of an RRC connection between the UE and the network used for the user plane data. At the Physical layer, the transport channels may be mapped to Physical channels.

LTE/LTE-A utilizes orthogonal frequency division multiple-access (OFDMA) on the downlink and single-carrier frequency division multiple-access (SC-FDMA) on the uplink. OFDMA and SC-FDMA partition the system bandwidth into multiple (K) orthogonal subcarriers, which are also commonly referred to as tones, bins, or the like. Each subcarrier may be modulated with data. The spacing between adjacent subcarriers may be fixed, and the total number of subcarriers (K) may be dependent on the system bandwidth. For example, K may be equal to 72, 180, 300, 600, 900, or 1200 with a subcarrier spacing of 15 kilohertz (KHz) for a corresponding system bandwidth (with guardband) of 1.4, 3, 5, 10, 15, or 20 megahertz (MHz), respectively. The system bandwidth may also be partitioned into sub-bands. For example, a sub-band may cover 1.08 MHz, and there may be 1, 2, 4, 8 or 16 sub-bands.

The wireless communications system 100 may support operation on multiple carriers, which may be referred to as carrier aggregation (CA) or multi-carrier operation. A carrier may also be referred to as a component carrier (CC), a channel, etc. The terms "carrier," "CC," and "channel" may be used interchangeably herein. A carrier used for the downlink may be referred to as a downlink CC, and a carrier used for the uplink may be referred to as an uplink CC. A UE may be configured with multiple downlink CCs and one or more uplink CCs for carrier aggregation. An eNB may transmit data and control information on one or more downlink CCs to the UE. The UE may transmit data and control information on one or more uplink CCs to the eNB.

Figure 2:
FIG. 2 is a table illustrating TDD Uplink-Downlink configurations in exemplary wireless communications system in accordance with various examples.

The carriers may transmit bidirectional FDD (e.g., paired spectrum resources) and/or TDD (e.g., unpaired spectrum resources) communications. Frame structures for FDD (e.g., frame structure type 1) and TDD (e.g., frame structure type 2) may be defined. Each frame structure may have a radio frame length $T_f=307200 \cdot T_s=10$ ms and may include $153600 \cdot T_s=5$ ms two half-frames of length each. Each half-frame may include five $30720 \cdot T_s=2$ ms subframes of length For TDD frame structures, each subframe may carry UL or DL traffic, and special subframes ("S") may be used to switch between DL to UL transmission. Allocation of UL and DL subframes within radio frames may be symmetric or asymmetric and may be reconfigured semi-statically (e.g., RRC messages via backhaul, etc.). Special subframes may carry some DL and/or UL traffic and may include a Guard Period (GP) between DL and UL traffic. Switching from UL to DL traffic may be achieved by setting timing advance at the UEs without the use of Special subframes or a guard period between UL and DL subframes. UL/DL configurations with switch-point periodicity equal to the frame period (e.g., 10 ms) or half of the frame period (e.g., 5 ms) may be supported. For example, TDD frames may include one or more Special frames, and the period between Special frames may determine the TDD DL-to-UL switch-point periodicity for the frame. For LTE/LTE-A, seven different UL/DL configurations are defined that provide between 40% and 90% DL subframes as illustrated in table FIG. 2 at Table 200. As indicated in table 200, there are two switching periodicities, 5 ms and 10 ms. For configurations with 5 ms switching periodicities, there are two special subframes per frame, and for configurations with 10 ms switching periodicities there is one special subframe per frame. Some of these configurations are symmetric, having the same number of uplink and downlink slots, while some are asymmetric, having different numbers of uplink and downlink slots. For example, TDDUL/DL configuration 1 is symmetric, with four uplink and four downlink subframes, TDD UL/DL configuration 5 favors downlink throughput, and TDD UL/DL configuration 0 favors uplink throughput.

The particular TDD UL/DL configuration that is used by a base station may be based on user requirements for the particular coverage area. For example, with reference again to FIG. 1, if a relatively large number of users in a geographic coverage area 110 are receiving more data than they are transmitting, the UL/DL configuration for the associated base station 105 may be selected to favor downlink throughput. Similarly, if a relatively large number of users in a coverage are 110 are transmitting more data than they are receiving, the UL/DL configuration for the associated base station 105 may be selected to favor uplink throughput and the base station 105 may operate using UL/DL configuration 0. In some aspects, a base station 105 may be able to dynamically reconfigure TDD UL/DL configurations to accommodate current traffic conditions. Such flexible TDD reconfiguration may occur semi-statically (e.g., transmitted in system information, paging messages, RRC signaling, etc.) or dynamically (e.g., medium access control (MAC) layer signaling, physical (PHY) layer signaling, etc.). Dynamic TDD reconfiguration may occur on the order of a single frame or several frames (e.g., 10 ms, 50 ms, etc.). Each cell may adapt the TDD configuration independently of other cells. These and other techniques for flexible TDD reconfiguration may be included in "enhanced Interference Management and Traffic Adaptation" (eIMTA), which may be implemented in some networks.

In such systems, UEs 115 that are reconfigured may receive the reconfiguration message, and transmit/receive subframes on subsequent TDD frames using the reconfigured UL/DL configuration. Such capabilities allow for relatively fast switching for the reconfigured UEs 115 according to the instantaneous traffic situation, and may provide enhanced packet throughput between the UEs 115 and base station 105. A UE 115, for example, may be in communication with a base station 105 using an initial TDD UL/DL configuration. This initial TDD UL/DL configuration, however, may become unfavorable for efficient packet throughput at a later point in time. For example, the user may switch from receiving a relatively large amount of data to transmitting a relatively large amount of data. In such a situation, a ratio of uplink to downlink transmission data may have a significant change, which may result a previously favorable UL/DL configuration becoming an unfavorable UL/DL configuration. Systems that employ eIMTA may dynamically reconfigure a UE to accommodate such changes.

Figure 3:
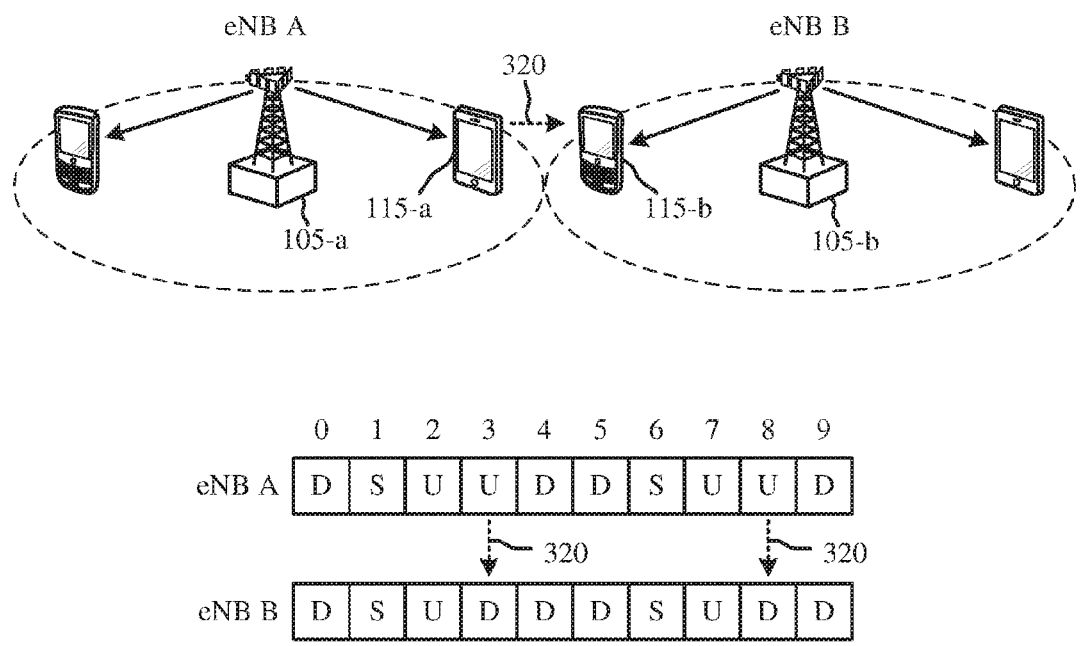
FIG. 3 illustrates a Cell Clustering Interference Mitigation environment with cells grouped according to cell clusters in accordance with various examples.

FIG. 3 shows a wireless communications system 300 illustrating neighboring cells using adaptive TDD configuration in accordance with various examples. Independent adaptation of TDD configuration by neighboring cells may introduce a new type of interference in eIMTA networks. Where neighboring eNBs use different TDD configurations, some UEs may experience UE-UE interference when receiving downlink transmissions in flexible subframes.

Figure 4:
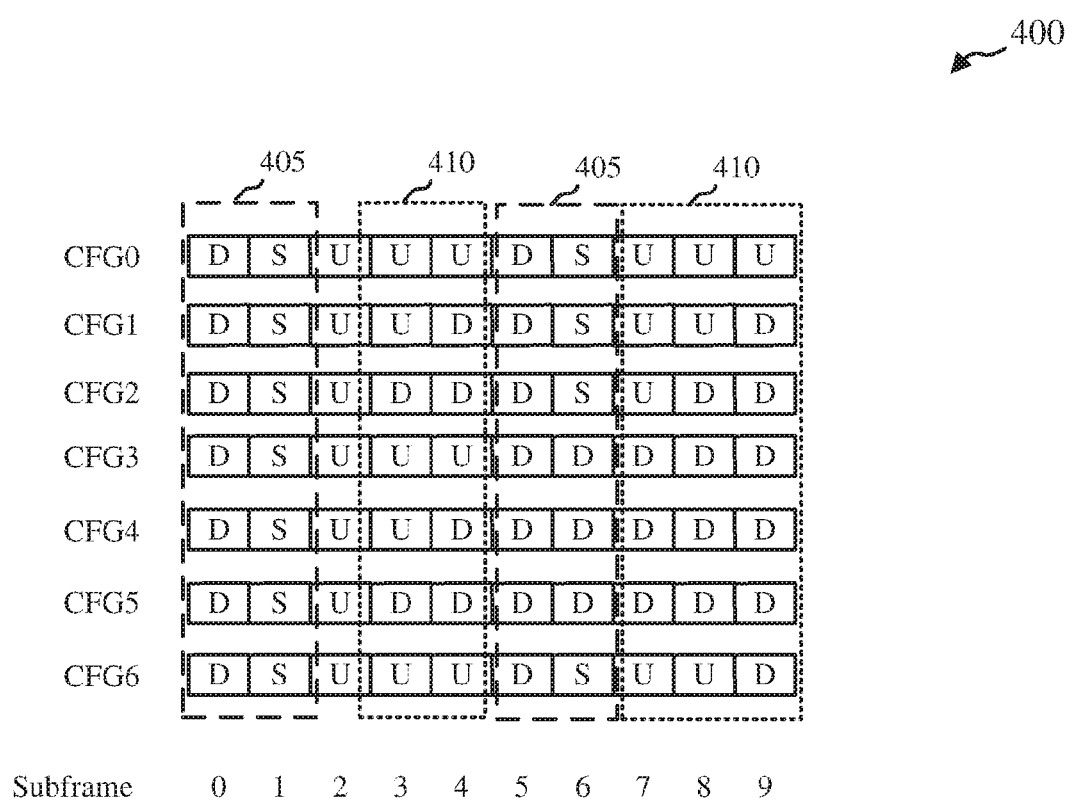
FIG. 4 is a table illustrating TDD Uplink-Downlink configurations and associated anchor and non-anchor subframes in accordance with various examples.

As illustrated in FIG. 4, selected (e.g., predetermined) TDD configurations may have some subframes that are always downlink or special subframes while some subframes may be flexibly allocated between uplink and downlink. Subframes that are fixed subframes for each TDD configuration and experience only eNB-UE interference may be called anchor subframes 405 while flexible subframes that may have both eNB-UE and UE-UE interference may be called non-anchor subframes 410. Interference in non-anchor subframes 410 may in some cases be different from interference in anchor subframes 405 because it includes both BS-UE interference and UE-UE interference.

Referring again to FIG. 3, eNB A 105-a may be serving UE 115-a while eNB B 105-b may be serving UE 115-b. As illustrated in FIG. 3, eNB A 105-a may be configured in TDD UL/DL configuration 1 for a particular frame N while eNB B 105-b may be configured in TDD UL/DL configuration 2. In addition to BS-UE interference (from other cells), UE 115-b may experience UE-UE interference 320 from UE 115-a in subframes 3 and 8, which may be different than the interference experienced by UE 115-b in other downlink subframes.

In examples, the different aspects of wireless communications systems 100 and/or 300 such as the base stations 105 and UEs 115, may be configured to perform separate channel feedback for anchor and non-anchor subframes, including channel quality indicators such as CSI, and may separately adapt channel modulation and coding schemes and/or interference mitigation techniques for the anchor and non-anchor subframes based on CSI reports. A UE 115, in some examples, may be configured to provide periodic CSI reports, and aperiodic CSI reports. Periodic CSI reports may be provided based on, for example, a reference configuration, and aperiodic CSI reports may be provided based on a timeline that is based on a time of reception of a CSI request and a reference subframe during which CSI is estimated. The CSI request may be used to initiate a periodic CSI report, an aperiodic CSI report, or some combination thereof. In some examples, the CSI request may indicate whether a periodic CSI report, an aperiodic CSI report, or some combination thereof is requested by a base station 105. This indication may be explicitly contained in the CSI request from the base station 105 to a UE 115, or may be determined by the UE 115 based on known parameters, policy, or other factors. In some examples, aperiodic CSI may be used for transmission of anchor subframe CSI reports, and periodic CSI may be used for transmission of non-anchor subframe CSI reports. In other examples, aperiodic CSI may be used for transmission of non-anchor subframe CSI reports, and periodic CSI may be used for transmission of anchor subframe CSI reports. A determination of the reference subframe for aperiodic CSI estimation may be based on a time of receipt of an aperiodic CSI request. In some examples, periodic CSI may be performed according to a timeline that is defined by a reference TDD UL/DL configuration. In further examples, periodic and aperiodic CSI reports may be transmitted in a single identified uplink subframe through multiplexing of the CSI reports using a physical uplink shared channel (PUSCH). According to some examples, periodic CSI may be provided, which may include channel quality indicator (CQI) estimates and precoding matrix index (PMI) reporting, for example. Various examples of such examples will be described with reference to FIGS. 5-19.

CSI reporting in TDD communications may be provided according to established periodicity values based on subframe configuration. For aperiodic CSI feedback, a CSI request may be transmitted by an eNB, followed by CSI estimation during a reference subframe determined by the subframe of the CSI request. The CSI estimate may then be transmitted in an identified uplink subframe. In some examples, transmission of UL aperiodic CSI information is at time n+k, where n denotes the subframe when the request has been received (e.g., DCI format 0/4 in physical downlink control channel (PDCCH) with CSI request field set to 1), and k is provided according to Table 1, which illustrates values of k for different subframes based on TDD UL/DL configuration, according to various examples.

TABLE 1

| TDD UL/DL Configuration | subframe number n | | | | | | | | | |
|---|---|---|---|---|---|---|---|---|---|---|
| | 0 | 1 | 2 | 3 | 4 | 5 | 6 | 7 | 8 | 9 |
| 0 | 4 | 6 | | | | 4 | 6 | | | |
| 1 | | 6 | | | 4 | | 6 | | | 4 |
| 2 | | | | 4 | | | | | 4 | |
| 3 | 4 | | | | | | | | 4 | 4 |
| 4 | | | | | | | | | 4 | 4 |
| 5 | | | | | | | | | 4 | |
| 6 | 7 | 7 | | | | 7 | 7 | | | 5 |

The reference subframe used for CSI estimation is n, which is the subframe in which the UE receives CSI trigger indicator, such as in DCI format 0/4.

Furthermore, in some implementations, in order to simplify the operations for eIMTA one or more TDD UL/DL configurations may be defined as a reference UL/DL configuration for many physical layer operations. For example, DL HARQ operations may be based on TDD UL/DL configuration 5, regardless of the actual TDD UL/DL configuration in use in a particular frame. Thus, if dynamic UL/DL subframe configuration is enabled, the DL HARQ timing may be based on the 9:1 UL/DL subframe configuration of TDD UL/DL configuration 5. At the same time, UL HARQ operation may be based on UL/DL subframe configuration 0, regardless of the actual UL/DL subframe configuration in use in a frame. Thus, if dynamic UL/DL subframe configuration is enabled, the UL HARQ timing may be based on the 4:6 UL/DL subframe configuration of TDD UL/DL reference configuration 0. In such a manner, physical layer operations may maintain established timing even though TDD UL/DL configurations may be reconfigured for a particular UE. According to various examples, CSI reporting may be provided that is based, in part, on a reference configuration.

Figure 5:
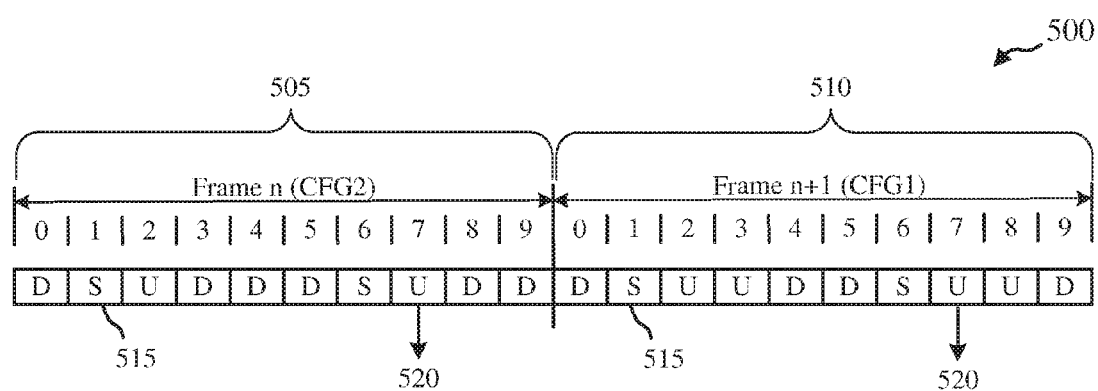
FIG. 5 shows a diagram of exemplary TDD frames with associated CSI estimation and transmission in accordance with various examples.

With reference now to FIG. 5, an example of periodic CSI reporting is discussed for various examples. Such periodic CSI reporting may be employed by the UEs 115 and base stations 105 described above with reference to FIGS. 1 and 3, for example. In the example of FIG. 5, a first frame (frame n) 505 may have TDD UL/DL configuration 2, and a second frame (frame n+1) 510 may, as a result of a dynamic reconfiguration, have TDD UL/DL configuration 1. The periodic CSI reporting timeline of this example may use reference configuration design. For example, an eNB may establish a reference TDD UL/DL configuration. A UE may identify a reference subframe 515 within each frame 505, 510, for estimating CSI based on the current TDD UL/DL configuration of the UE. The UE may then estimate CSI for the reference subframe 515, transmit the estimated CSI in an identified periodic uplink subframe 520, which may be determined based on the reference TDD UL/DL configuration. In some examples, the reference TDD UL/DL configuration is a semi-static reference configuration indicated to the UE by the eNB through, for example, Level 1 (L1) signaling, radio resource control (RRC) signaling, and/or medium access control (MAC) signaling.

In this way, the CSI may be reported in fixed uplink subframe regardless of any TDD UL/DL reconfigurations of the UE. According to some examples, TDD UL/DL configuration 2 may be used as the reference configuration if TDD configuration 0/1/2/6 is used. Thus, a UE may be reconfigured to any of configurations 0/1/2/6, and the CSI report may be sent in subframe number 2 or 7. In other examples, TDD UL/DL configuration 5 may be used as the reference configuration, all 7 TDD configurations may be used, and the CSI report may only be sent in subframe #2. As noted above, the reference configuration may be fixed or semi-static, for example. A semi-static reference configuration may be indicated to UE through, for example, RRC signaling and/or L1 signaling. Furthermore, the L1 signaling may be implicit or explicit. In some examples, scheduling requests and/or sounding reference signals (SRS) may reuse the reference configuration timeline for P-CSI.

Figure 6A:
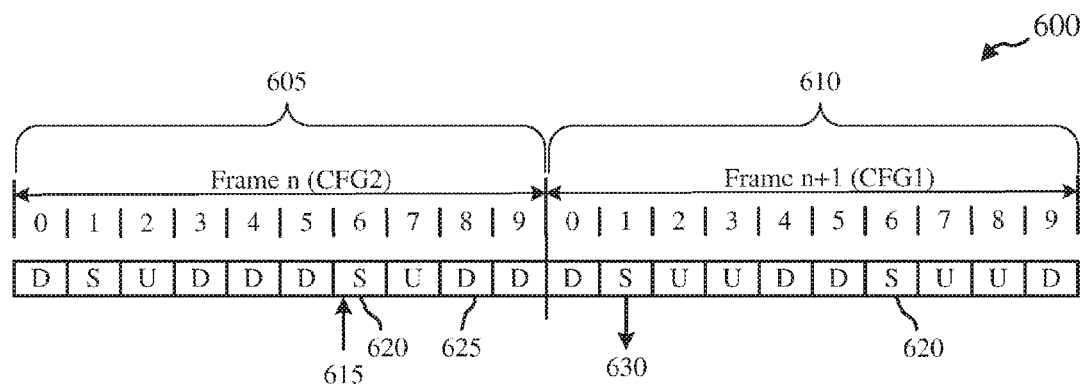
FIGS. 6A and 6B show a diagrams of exemplary TDD frames associated CSI estimation and transmission in accordance with various examples.
Figure 6B:
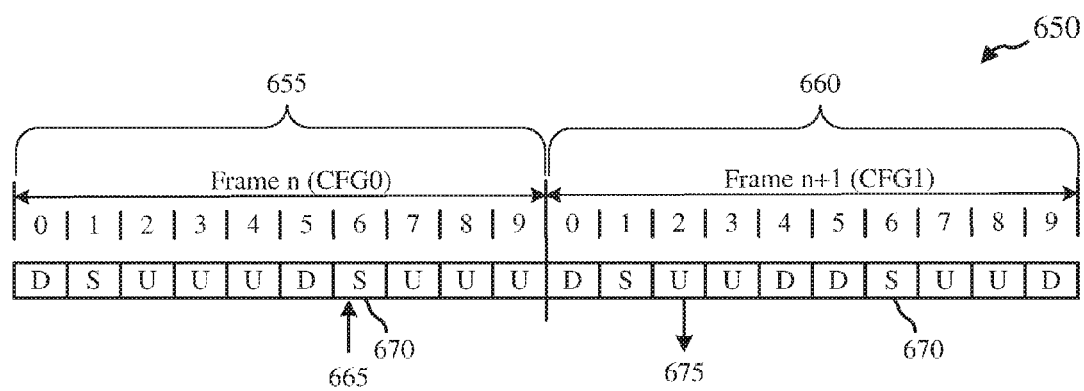

While such a reference configuration may be used for periodic CSI, aperiodic CSI may have a different timeline, as changed TDD UL/DL configurations may impact the reference subframe for an aperiodic CSI, as well as the identified uplink subframe in which aperiodic CSI is to be transmitted to the base station. With reference now to FIGS. 6A and 6B exemplary TDD frames 600 and 650 are described with reference to CSI timing, according to some examples. With reference first to FIG. 6A, a first frame (frame n) 605 may have TDD UL/DL configuration 2, and a second frame (frame n+1) 610 may have a different TDD UL/DL configuration, namely TDD UL/DL configuration 1. A CSI request 615 may be received in subframe 6 of the first frame 605.

In some examples, after receiving CSI request 615, a UE may estimate both anchor and non-anchor CSI. In order to estimate CSI, the UE determines an anchor reference TDD subframe 620 and a non-anchor reference TDD subframe 625. The UE, according to examples such as illustrated in FIG. 6A, may multiplex the anchor CSI and the non-anchor CSI and transmit a CSI report 630 to the eNB. Anchor reference TDD subframe 620, according to some examples, may be determined based on the subframe in which the CSI request 615 is received. In some examples, the subframe that triggers the CSI measurement may be identified as subframe n, and the anchor reference TDD subframe 620 may be defined as n+k, which is the closest anchor subframe for a value of k that is greater than or equal to zero. For non-anchor reference TDD subframe 625, again the trigger subframe may be n, and the reference non-anchor subframe is n+k that is the closest non-anchor downlink subframe for a value of k that is greater than or equal to zero. Such an aperiodic CSI format may be signaled from the base station to the UE via, for example, RRC configuration or a dynamic indication in L1 signaling.

With reference to FIG. 6B, in some cases, one or more of the non-anchor subframes may be invalid for measurement. In the example of FIG. 6B, a first frame (frame n) 655 may have TDD UL/DL configuration 0, and a second frame (frame n+1) 660 may have a different TDD UL/DL configuration, namely TDD UL/DL configuration 1. A CSI request 665 may be received in subframe 6 of the first frame 655. In this example, anchor reference subframe 670 may be determined as discussed above with respect to FIG. 6A, but there is no corresponding non-anchor downlink reference subframe, as the particular TDD UL/DL configuration contains only uplink subframes (subframes 7-9 of frame 655). In such cases, the corresponding aperiodic CSI report 675 for such non-anchor subframes may be omitted while still reporting corresponding CSI of anchor reference subframe 670. In such a case, there is no need to multiplex the CSI information, and the anchor reference subframe 670 CSI estimate is reported.

Thus, FIGS. 6A and 6B illustrate provide that both anchor and non-anchor subframe CSI may be reported after a UE, such as UE 115 of FIGS. 1 and/or 3, for example, receives a CSI request. Based on the CSI request, the UE may determine that CSI is to be estimated for anchor reference TDD subframe 620 or 670, and/or a non-anchor reference TDD subframe 625, and perform an estimate of CSI for the determined subframes. In some cases, the UE may determine from the CSI request whether a CSI report should be periodic, aperiodic, or a combination thereof. In other examples, the CSI report may be statically configured as periodic, aperiodic, or a combination thereof. The UE may then transmit the anchor and non-anchor CSI in an aperiodic CSI report 630 or 675 transmitted in an identified uplink subframe. The identified uplink subframe may be determined, for example, based on a time of receipt of the CSI request, according to the timing illustrated in Table 1.

Figure 7A:
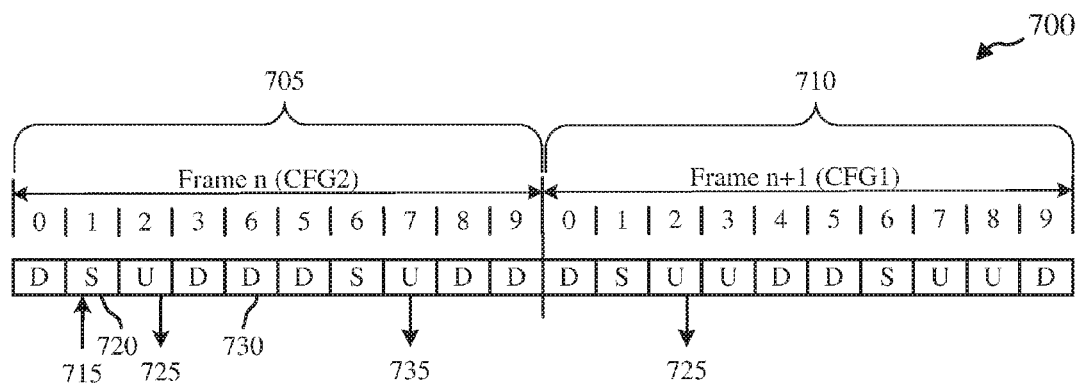
FIGS. 7A and 7B show a diagrams of exemplary TDD frames associated CSI estimation and transmission in accordance with various examples.
Figure 7B:
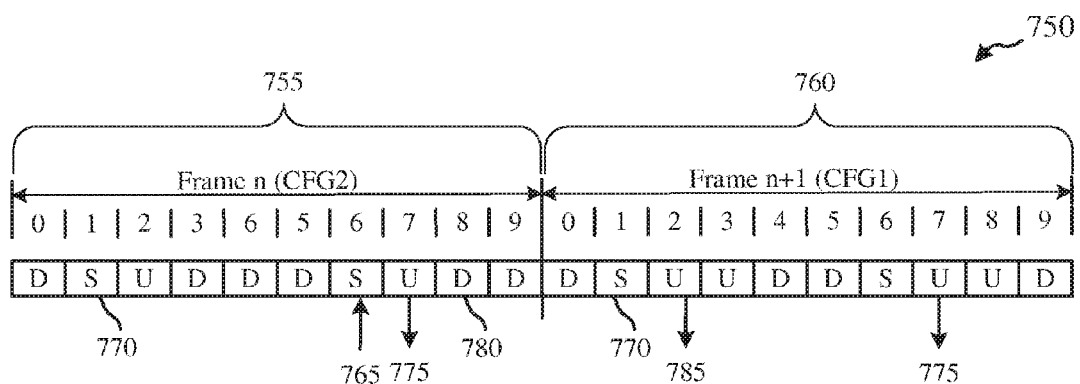

With reference now to FIGS. 7A and 7B, exemplary TDD frames 700 and 750, respectively, are described with reference to CSI timing, according to some examples. According to some examples, a base station may use periodic/aperiodic CSI to differentiate anchor/non-anchor CSI feedback. With reference first to FIG. 7A, a first frame (frame n) 705 may have TDD UL/DL configuration 2, and a second frame (frame n+1) 710 may have a different TDD UL/DL configuration, namely TDD UL/DL configuration 1. In this example, a base station may use aperiodic CSI for anchor subframe CSI reports, and use periodic CSI for non-anchor subframe CSI reports. According to various examples, aperiodic CSI timing may include receiving an aperiodic CSI request 715. As noted above, aperiodic CSI may be used for anchor subframe CSI reports, and thus the UE may determine an anchor reference subframe 720. The anchor reference subframe 720 may be determined similarly as discussed above with respect to FIG. 6 for aperiodic reference subframe determination. An anchor CSI transmission 735 may be transmitted based on the anchor CSI estimation, the timing of which may be determined by trigger subframe in which the CSI request 715 was received and the timing described with respect to Table 1, and the identified uplink subframe for transmissions 735 is determined based on the reference TDD UL/DL configuration for the UE.

Non-anchor reference subframe 730 may be determined, similarly as discussed above, with respect to FIG. 6 for aperiodic reference subframe determination. In the example of FIG. 7A, non-anchor reference subframes 730 are determined and CSI is estimated for these subframes 730, which is then reported in periodic CSI transmissions 725. The timing of transmissions 725 may be determined based on the periodic non-anchor reference subframes 730 and the timing as discussed with respect to Table 1, and the identified uplink subframe for transmissions 725 is determined based on the reference TDD UL/DL configuration for the UE. According to some examples, in the event of a collision between aperiodic CSI and periodic CSI reports, the UE can drop transmission of the periodic CSI, drop transmission of the aperiodic CSI, or multiplex both the CSI reports in a PUSCH transmission.

FIG. 7B illustrates exemplary frames 755 and 760 in which a base station may use aperiodic CSI for non-anchor subframe CSI reporting, and use periodic CSI for anchor subframe CSI reporting. The first frame (frame n) 755 may have TDD UL/DL configuration 2, and the second frame (frame n+1) 760 may have a different TDD UL/DL configuration, namely TDD UL/DL configuration 1. The anchor reference subframe 770 in this example is a periodic CSI reference subframe, and a reference configuration, similarly as discussed above, may be used to determine the anchor reference subframe 770 and timing for a periodic anchor CSI report 775. The anchor reference subframe 770 may be determined based on the current configured TDD UL/DL configuration of the UE. An aperiodic CSI request 765 may be received, and a corresponding non-anchor reference subframe 780 may be defined based on the subframe that triggers the CSI reporting, referred to as subframe n. The non-anchor reference subframe 780 may be defined as subframe n+k, in which k is the closest non-anchor subframe for a value of k greater than or equal to zero, similarly as discussed above. As with the example of FIG. 7A, in the event of a collision between aperiodic CSI and periodic CSI reports, the UE can drop transmission of the periodic CSI, drop transmission of the aperiodic CSI, or multiplex both the CSI reports in a PUSCH transmission.

Figure 8:
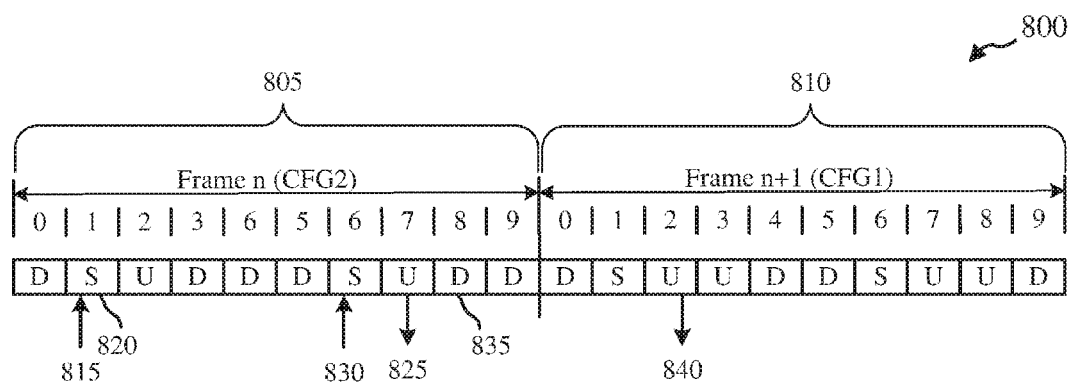
FIG. 8 shows a diagrams of exemplary TDD frames associated CSI estimation and transmission in accordance with various examples.

With reference now to FIG. 8, exemplary TDD frames 800 are described with respect to CSI reporting for further examples, in which a base station may notify a UE to report anchor or non-anchor CSI through explicit signaling. In the example, of FIG. 8, a first frame (frame n) 805 may have TDD UL/DL configuration 2, and a second frame (frame n+1) 810 may have a different TDD UL/DL configuration, namely TDD UL/DL configuration 1. In the example of FIG. 8, a base station may explicitly indicate anchor/non-anchor CSI report type using L1 signaling. In such examples, an aperiodic CSI request 815 or 830 may be received, and a reference subframe 820 or 835 may be defined for aperiodic CSI report 825 or 840. The aperiodic request 815 or 830 triggers determination of the aperiodic reference subframe 820 or 835.

According to some examples, the trigger subframe is subframe n, and the reference subframe may be defined as subframe n+k that is the closest aperiodic reference subframe 820 or 835, in which k is greater than or equal to zero. As indicated above, the aperiodic reference subframe may be an anchor subframe 820 or non-anchor subframe 835, depending on whether anchor or non-anchor CSI reporting is being signaled. Such signaling may be, for example, a bit added in an eIMTA CSI type field in L1 signaling of reconfiguration, such as illustrated in Table 2, for example. A reference configuration, such as described with respect to FIG. 5, may be used for the aperiodic CSI reporting and related timing.

TABLE 2

| Value of eIMTA CSI type | Description |
| --- | --- |
| 0 | Aperiodic report CSI of anchor subframe |
| 1 | Aperiodic report CSI of non-anchor subframe |

In some other examples, a CSI request field signaled from a base station to a UE may be redefined to provide a 2-bit CSI request field, such as illustrated in Table 3.

TABLE 3

| Value of CSI request | Description |
| --- | --- |
| 01 | Aperiodic CSI report is triggered for anchor CSI report for $1^{st}$ set of serving cells |
| 10 | Aperiodic CSI report is triggered for non-anchor CSI report for $1^{st}$ set of serving cells |

Figure 9:
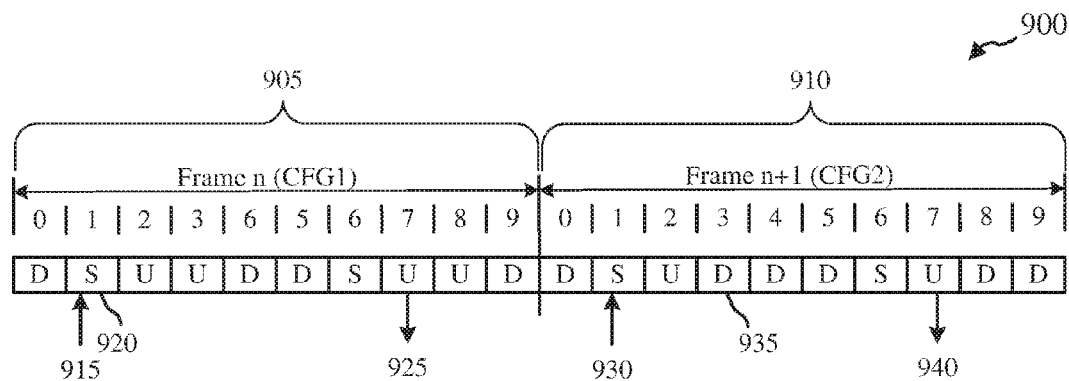
FIG. 9 shows a diagram of exemplary TDD frames associated CSI estimation and transmission in accordance with various examples.

With reference now to FIG. 9, exemplary TDD frames 900 are described with respect to CSI reporting for further examples, in which a UE may implicitly determine aperiodic CSI feedback type to differentiate anchor/non-anchor CSI feedback. In the example, of FIG. 9, a first frame (frame n) 905 may have TDD UL/DL configuration 1, and a second frame (frame n+1) 910 may have a different TDD UL/DL configuration, namely TDD UL/DL configuration 2. In the example of FIG. 9, in order to make such a determination, a reference subframe 920 or 935 may be defined. If a trigger subframe is identified as subframe n in which CSI request 915 or 930 is received, reference subframes 920 or 935 may be determined as subframe n+k that is the closest anchor/non-anchor subframe for a value of k that is greater than or equal to zero. In some examples, a UE may report anchor CSI 925 when the current frame index is odd, and may report non-anchor CSI 940 when the current frame index is even. Of course, other examples may provide a UE reporting non-anchor CSI in odd frames, and anchor CSI in even frames. Various other variations of implicit determination of anchor and non-anchor feedback based on frame index, and/or other information, may be implemented as well.

Figure 10:
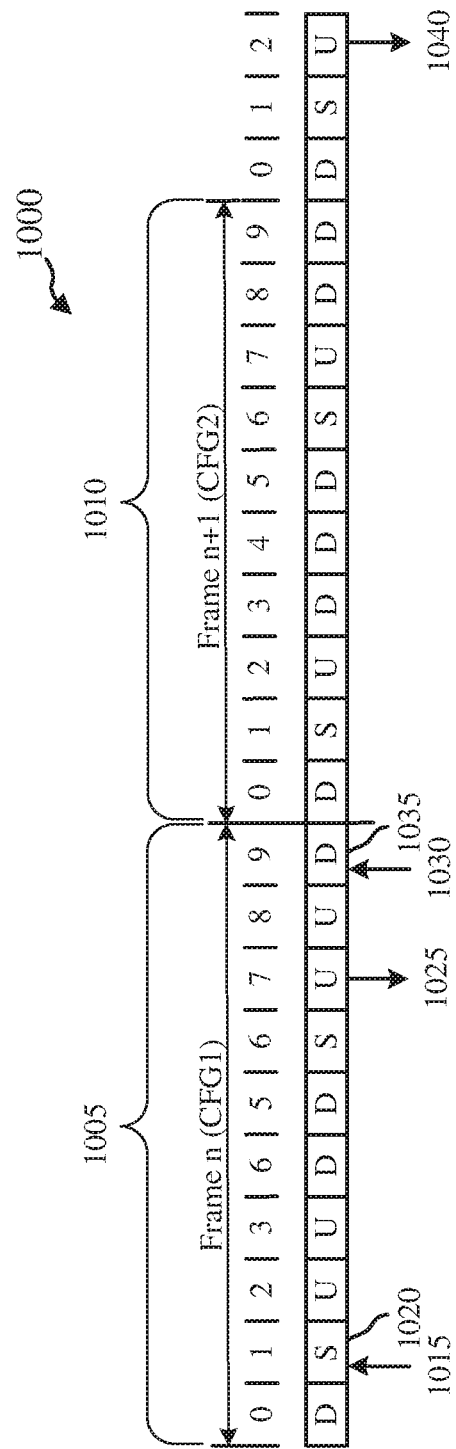
FIG. 10 shows a diagram of exemplary TDD frames associated CSI estimation and transmission in accordance with various examples.

With reference now to FIG. 10, exemplary TDD frames 1000 are described with respect to CSI reporting for further examples, in which a new reporting timeline may be provided in which a base station and UE may use the current dynamically configured TDD configuration for aperiodic CSI timing, instead of UL reference configuration. In the example, of FIG. 10, a first frame (frame n) 1005 may have TDD UL/DL configuration 1, and a second frame (frame n+1) 1010 may have a different TDD UL/DL configuration, namely TDD UL/DL configuration 2. In the example of FIG. 10, after receiving CSI requests 1015 or 1030, a UE may report aperiodic CSI 1025 or 1040 in the first valid fixed UL subframe n+k, where k is greater than or equal to 4. Thus, identified uplink subframes for transmitting CSI reports 1025, and 1040 may be determined based on a current dynamically configured TDD UL/DL configuration, with the identified uplink subframe determined based on a downlink trigger subframe containing the CSI request and closest subsequent uplink subframe that is at least k subframes after the trigger subframe.

Figure 11:
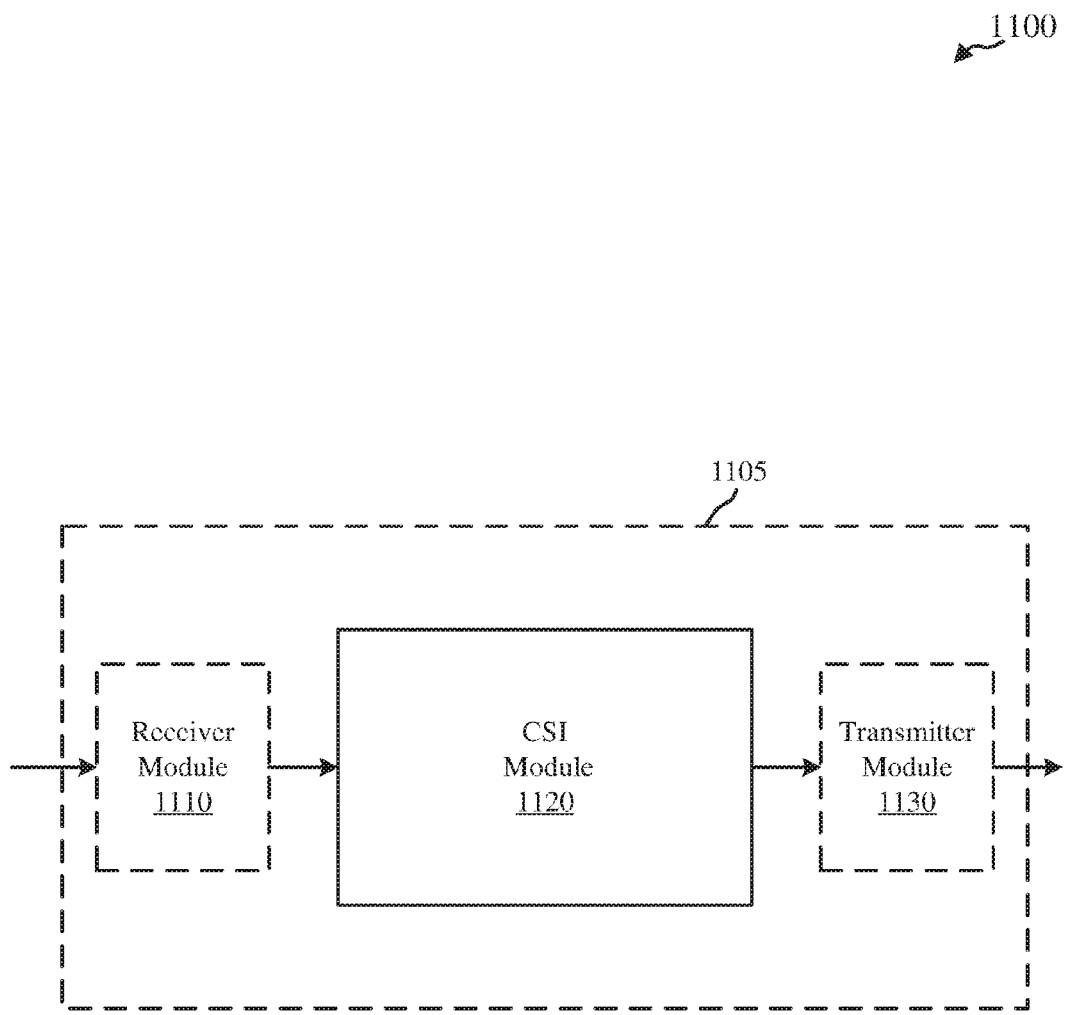
FIG. 11 shows a block diagram of an example of a device for CSI reporting in accordance with various examples.

Referring now to FIG. 11, a block diagram 1100 illustrates a device 1105 for use in wireless communications in accordance with various examples. In some examples, the device 1105 may be an example of one or more aspects of the base stations 105 or UEs 115 described with reference to FIGS.

1 and/or 3. The device 1105 may also be a processor. The device 1105 may include a receiver module 1110, a CSI module 1120, and/or a transmitter module 1130. Each of these components may be in communication with each other.

The components of the device 1105 may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

In some examples, the receiver module 1110 may be or include a radio frequency (RF) receiver, such as an RF receiver operable to receive wireless transmissions. The receiver module 1110 may be used to receive various types of data and/or control signals (i.e., transmissions) over one or more communication links of a wireless communications system such as one or more communication links of the wireless communications system 100 and/or 300 described with reference to FIGS. 1 and/or 3.

In some examples, the transmitter module 1130 may be or include an RF transmitter that may be used to transmit various types of data and/or control signals (i.e., transmissions) over one or more communication links of a wireless communications system, such as one or more communication links of the wireless communications system 100 and/or 300 described with reference to FIGS. 1 and/or 3. In some examples, the CSI module 1120 may configure and/or perform CSI determination and/or signaling operations. CSI operations performed by CSI module 1120 may include some or all of the provisioning operations discussed above with respect to FIGS. 5 through 10.

Figure 12:
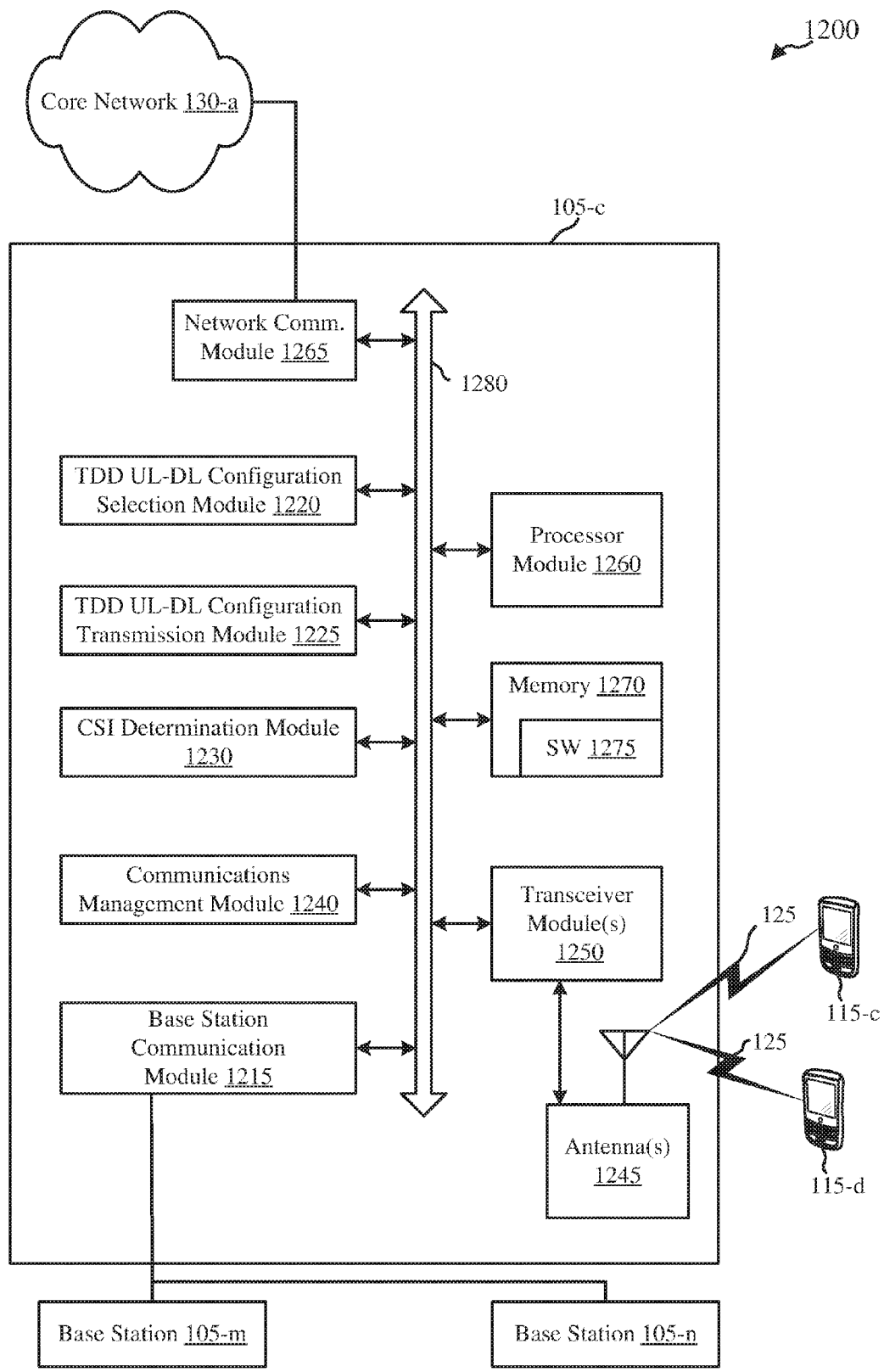
FIG. 12 shows a block diagram of an example of a base station in accordance with various examples.

FIG. 12 shows a block diagram of a wireless communications system 1200 that may be configured for CSI reporting in accordance with various aspects. This wireless communications system 1200 may be an example of aspects of the wireless communications system 100 depicted in FIG. 1, or the wireless communications system 300 of FIG. 3. The wireless communications system 1200 may include a base station 105-c. In some examples, the base station 105-c may be an example of one or more aspects of the eNBs or base stations 105 and/or 1105 described with reference to FIGS. 1, 3, and/or 11. The base station 105-c may be configured to implement at least some of the CSI features and functions described with respect to FIG. 1, 3, 5, 6A, 6B, 7A, 7B, 8, 9, 10, and/or 11. The base station 105-c may include antenna(s) 1245, a transceiver module 1250, memory 1270, and a processor module 1260, which each may be in communication, directly or indirectly, with each other (e.g., over one or more buses 1280). The transceiver module 1250 may be configured to communicate bi-directionally, via the antenna(s) 1245, with UEs 115-a, 115-b. The transceiver module 1250 (and/or other components of the base station 105-c) may also be configured to communicate bi-directionally with one or more networks. In some cases, the base station 105-c may communicate with the core network 130-a through network communications module 1265. Base station 105-c may be an example of an eNodeB base station, a Home eNodeB base station, a NodeB base station, and/or a Home NodeB base station.

Base station 105-c may also communicate with other base stations 105, such as base station 105-m and base station 105-n. In some cases, base station 105-c may communicate with other base stations such as 105-m and/or 105-n utilizing base station communication module 1215. In some examples, base station communication module 1215 may provide an X2 interface within an LTE wireless communication technology to provide communication between some of the base stations 105. In some examples, base station 105-c may communicate with other base stations through core network 130-a.

The memory 1270 may include random access memory (RAM) and read-only memory (ROM). The memory 1270 may also store computer-readable, computer-executable software code 1275 containing instructions that are configured to, when executed, cause the processor module 1260 to perform various functions described herein (e.g., call processing, database management, message routing, etc.). Alternatively, the computer-executable software code 1275 may not be directly executable by the processor module 1260 but be configured to cause the processor, e.g., when compiled and executed, to perform functions described herein.

The processor module 1260 may include an intelligent hardware device, e.g., a central processing unit (CPU), a microcontroller, an application-specific integrated circuit (ASIC), etc. The transceiver module(s) 1250 may include a modem configured to modulate the packets and provide the modulated packets to the antenna(s) 1245 for transmission, and to demodulate packets received from the antenna(s) 1245. While some examples of the base station 105-c may include a single antenna 1245, the base station 105-c may include multiple antennas 1245 for multiple links which may support carrier aggregation. For example, one or more links may be used to support macro communications with UEs 115-a, 115-b.

According to the architecture of FIG. 12, the base station 105-c may further include a communications management module 1240. The communications management module 1240 may manage communications with other base stations 105. By way of example, the communications management module 1240 may be a component of the base station 105-c in communication with some or all of the other components of the base station 105-c via a bus 1280. Alternatively, functionality of the communications management module 1240 may be implemented as a component of the transceiver module 1250, as a computer program product, and/or as one or more controller elements of the processor module 1260.

In some examples, base station 105-c includes a TDD UL/DL configuration selection module 1220 that determines a TDD UL/DL configuration for UEs 115-a, 115-b. At some point, TDD UL/DL configuration selection module 1220 may determine that the UL/DL configuration for one or more UE 115 is to be reconfigured to a different UL/DL configuration. For example, changes in traffic between the base station 105-c and UE 115-b may change such that additional data is to be transmitted to UE 115-b, in which case the TDD UL/DL configuration selection module 1220 may determine that UE 115-b is to be reconfigured to operate according to a different UL/DL configuration. Base station 105-c may transmit the new TDD UL/DL configuration to the UE 115-f through TDD UL/DL configuration transmission module 1225, in conjunction with transceiver module(s) 1250.

As mentioned above, CSI for anchor and non-anchor subframes may be transmitted by UEs 115, which may be used by base station 105-c for modifying one or more communications parameters with UEs 115. The CSI determination module 1230 may be configured to perform and/or control some or all of the base station CSI functions or aspects described with reference to 1, 3, 5, 6A, 6B, 7A, 7B, 8, 9, 10, and/or 11 related to CSI signaling and reporting with a UE. For example, the CSI determination module 1230 may prepare a CSI request. In some cases, the CSI request indicate to a UE 115 whether a CSI report should be periodic, aperiodic, or some combination thereof. The indication of periodic or aperiodic CSI reporting may be explicitly included in the CSI request from the base station 105-c. Additionally or alternatively, the UE 115 may dynamically determine whether the base station 105-c is requesting a periodic CSI report, an aperiodic CSI report, or some combination thereof based on known parameters, policy, or factors. In some examples, the periodicity or a periodicity of the CSI request may be statically configured. The CSI determination module 1230, or portions of it, may include a processor and/or some or all of the functionality of the CSI determination module 1230 may be performed by the processor module 1260 and/or in connection with the processor module 1260.

Figure 13:
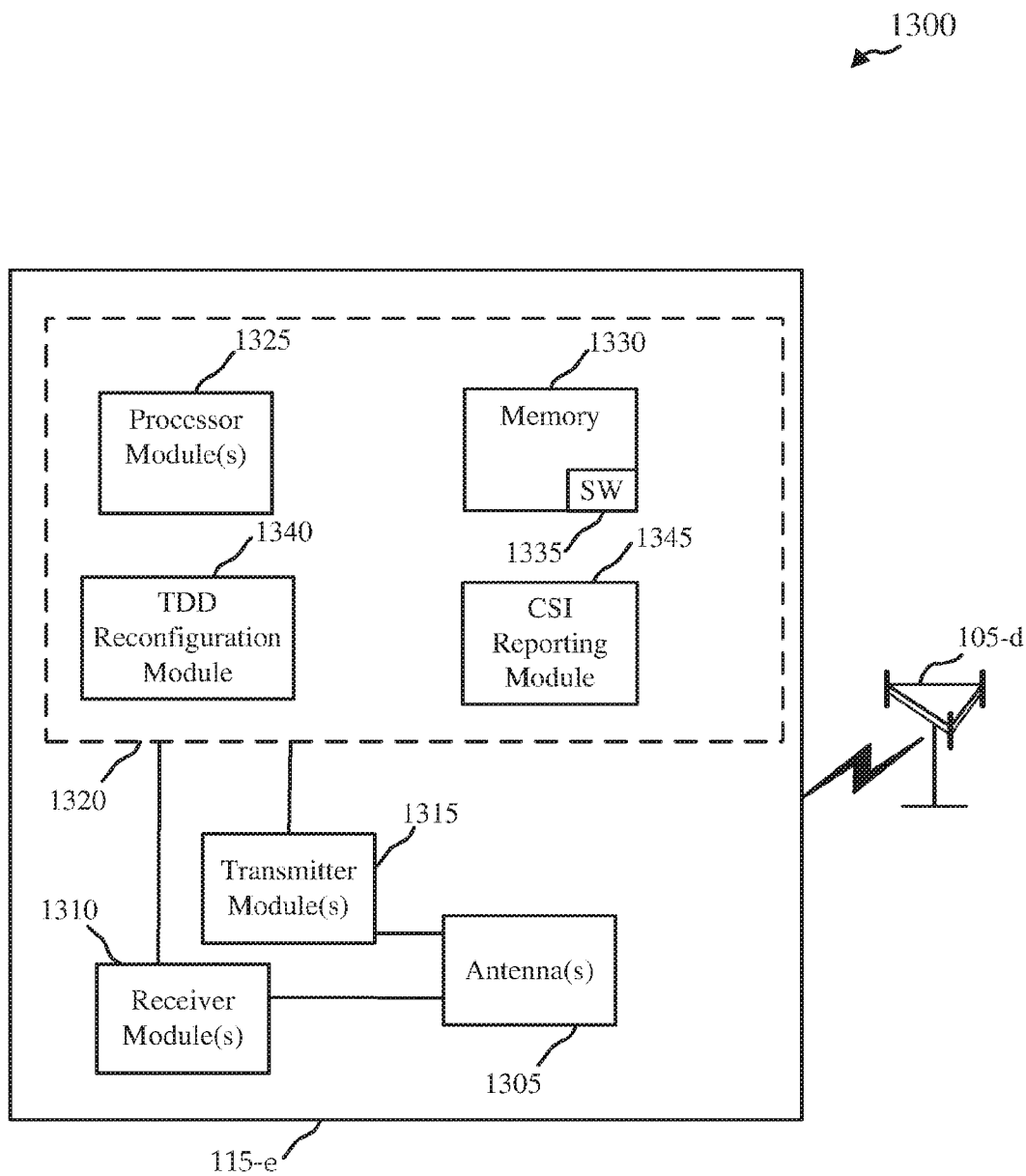
FIG. 13 shows a block diagram of an example of a user equipment in accordance with various examples.

With reference now to FIG. 13, an example wireless communications system 1300 that performs CSI estimation and reporting is depicted. The wireless communications system 1300 includes a UE 115-e that may communicate with base station 105-d to receive access to one or more wireless networks, and may be an example of aspects of the wireless communications system 100 of FIG. 1, the wireless communications system 300 of FIG. 3, device 1105 of FIG. 22, and/or the wireless communications system 1200 of FIG. 12. UE 115-e may be an example of a UE 115 of FIGS. 1, 3, and/or 6. The UE 115-e may be configured to implement at least some of the CSI features and functions described with respect to FIG. 1, 3, 5, 6A, 6B, 7A, 7B, 8, 9, 10, 11, and/or 12. UE 115-e includes one or more antenna(s) 1305 communicatively coupled to receiver module(s) 1310 and transmitter module(s) 1315, which are in turn communicatively coupled to a control module 1320. Control module 1320 includes one or more processor module(s) 1325, a memory 1330 that may include computer-executable software code 1335, a TDD reconfiguration module 1340, and a CSI reporting module 1345. The computer-executable software code 1335 may be for execution by processor module 1325, TDD reconfiguration module 1340, and/or CSI reporting module 1345.

The processor module(s) 1325 may include an intelligent hardware device, e.g., a central processing unit (CPU), a microcontroller, an application specific integrated circuit (ASIC), etc. The memory 1330 may include random access memory (RAM) and read-only memory (ROM). The memory 1330 may store computer-readable, computer-executable software code 1335 containing instructions that are configured to, when executed (or when compiled and executed), cause the processor module 1325 and/or TDD reconfiguration module 1340 to perform various functions described herein (e.g., TDD UL/DL reconfiguration, and transmission of HARQ information on identified uplink resources). The TDD reconfiguration module 1340 and/or CSI reporting module 1345 may be implemented as a part of the processor module(s) 1325, or may be implemented using one or more separate CPUs or ASICs, for example. The transmitter module(s) 1315 may transmit to base station 105-g (and/or other base stations) to establish communications with one or more wireless communications networks (e.g., E-UTRAN, UTRAN, etc.), as described above. The TDD reconfiguration module 1340 may be configured to receive TDD reconfiguration messages from base station 105-d and change a TDDUL/DL configuration based on the received messages. The CSI reporting module 1345 may be configured to perform and/or control some or all of the UE CSI functions or aspects described with reference to 1, 3, 5, 6A, 6B, 7A, 7B, 8, 9, 10, 11, and/or 12 related to CSI signaling, estimation, and reporting. The CSI reporting module 1345, or portions of it, may include a processor and/or some or all of the functionality of the CSI reporting module 1345 may be performed by the processor module 1325 and/or in connection with the processor module 1325. The receiver module(s) 1310 may receive downlink transmissions from base station 105-d (and/or other base stations), as described above. Downlink transmissions are received and processed at the UE 115-e. The components of UE 115-e may, individually or collectively, be implemented with one or more Application Specific Integrated Circuits (ASICs) adapted to perform some or all of the applicable functions in hardware. Each of the noted modules may be a means for performing one or more functions related to operation of the UE 115-e.

Figure 14:
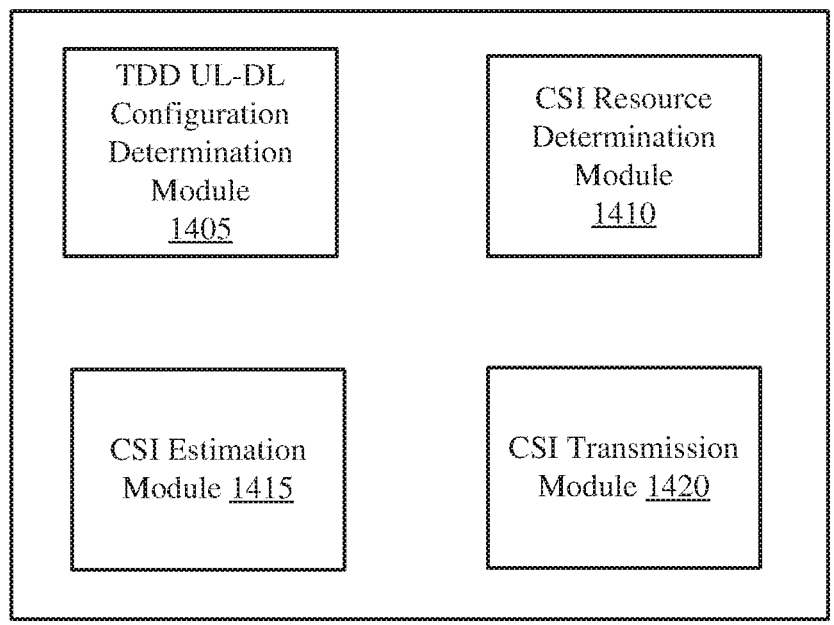
FIG. 14 shows a block diagram of an example of CSI reporting in accordance with various examples.

FIG. 14 illustrates an example of a CSI reporting module 1345-a, which includes a TDD UL/DL configuration determination module 1405, a CSI resource determination module 1410, a CSI estimation module 1415, and a CSI transmission module 1420. The TDD UL/DL configuration determination module 1205 may receive TDD UL/DL configuration information from a base station, and set the TDD UL/DL configuration according to the information. This information may be received through a system information block (e.g., SIB1), or may be received through one or more reconfiguration messages received from the base station in accordance with eIMTA, for example. The CSI resource determination module 1410 may determine anchor and/or non-anchor reference subframes for estimation of CSI, as discussed above. The CSI estimation module 1415 may perform CSI estimation for anchor and non-anchor subframes, as discussed herein. CSI transmission module 1420 may identify one or more uplink subframes for transmission of CSI report(s), also as discussed herein. The components of CSI reporting module 1345-a may, individually or collectively, be implemented with one or more ASICs adapted to perform some or all of the applicable functions in hardware. Each of the noted modules may be a means for performing one or more functions related to operation of the CSI reporting module 1345-a.

Figure 15:
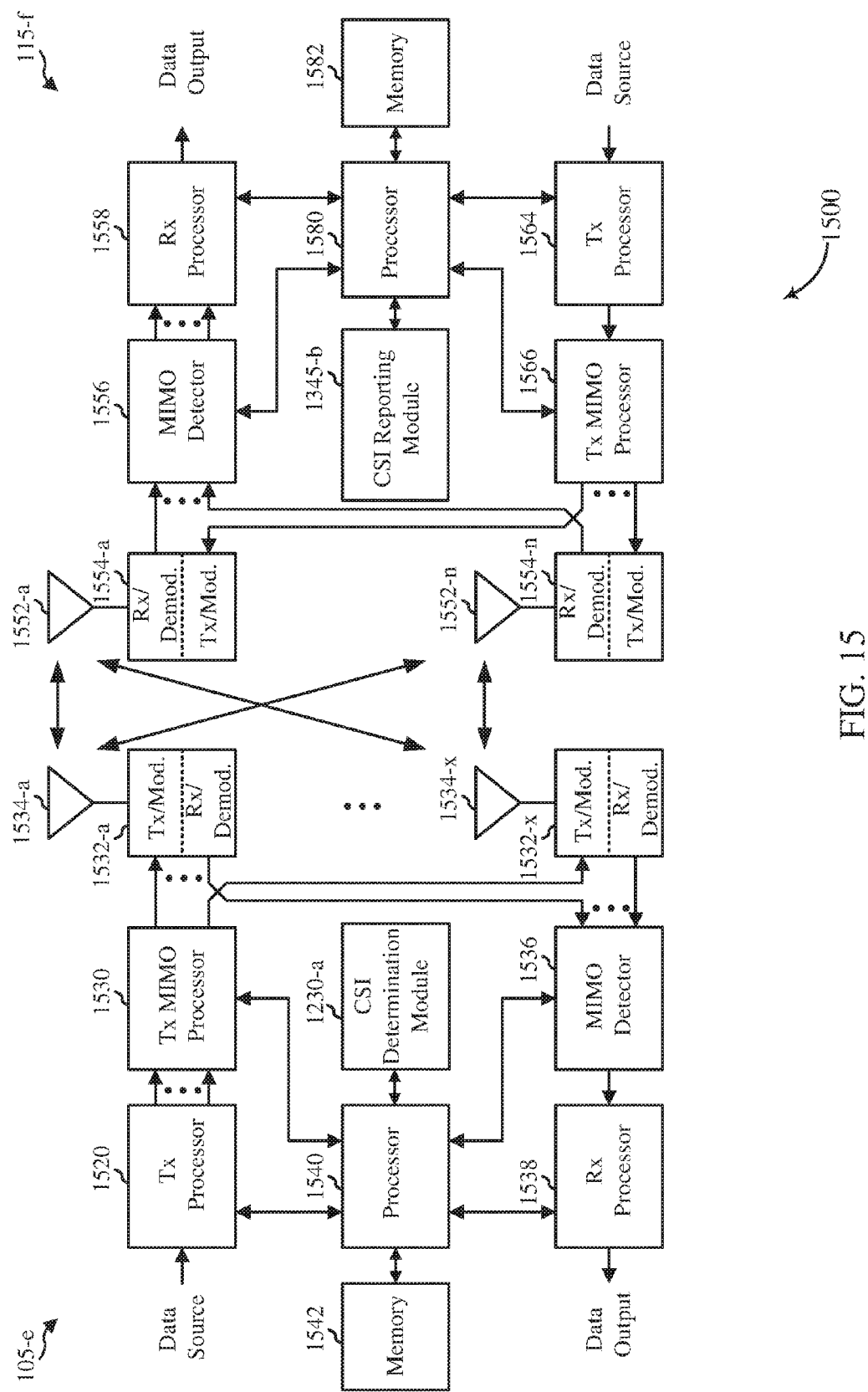
FIG. 15 is a block diagram of an example of a wireless communications system including a base station and a mobile device in accordance with various examples.

FIG. 15 is a block diagram of a system 1500 including a base station 105-e and a UE 115-f. This system 1500 may be an example of the wireless communications system 100 of FIG. 1, the wireless communications system 300 of FIG. 3, the wireless communications system 1200 of FIG. 12, or the wireless communications system 1300 of FIG. 13. The base station 105-e may be equipped with antennas 1534-a through 1534-x, and the UE 115-f may be equipped with antennas 1552-a through 1552-n. At the base station 105-e, a transmit processor 1520 may receive data from a data source.

The transmit processor 1520 may process the data. The transmit processor 1520 may also generate reference symbols, and a cell-specific reference signal. A transmit (TX) MIMO processor 1530 may perform spatial processing (e.g., precoding) on data symbols, control symbols, and/or reference symbols, if applicable, and may provide output symbol streams to the transmit modulator/demodulators 1532-a through 1532-x. Each modulator/demodulator 1532 may process a respective output symbol stream (e.g., for OFDM, etc.) to obtain an output sample stream. Each modulator/demodulator 1532 may further process (e.g., convert to analog, amplify, filter, and upconvert) the output sample stream to obtain a downlink (DL) signal. In one example, DL signals from modulator/demodulators 1532-a through 1532-x may be transmitted via the antennas 1534-a through 1534-x, respectively according to a particular TDD Uplink/Downlink configuration.

At the UE 115-f, the UE antennas 1552-a through 1552-n may receive the DL signals according to the particular TDD Uplink/Downlink configuration from the base station 105-e and may provide the received signals to the modulator/demodulators 1554-a through 1554-n, respectively. Each modulator/demodulator 1554 may condition (e.g., filter, amplify, downconvert, and digitize) a respective received signal to obtain input samples. Each modulator/demodulator 1554 may further process the input samples (e.g., for OFDM, etc.) to obtain received symbols. A MIMO detector 1556 may obtain received symbols from all the modulator/demodulators 1554-a through 1554-n, perform MIMO detection on the received symbols if applicable, and provide detected symbols. A receive processor 1558 may process (e.g., demodulate, deinterleave, and decode) the detected symbols, providing decoded data for the UE 115-f to a data output, and provide decoded control information to a processor 1580, or memory 1582. The processor 1580 may be coupled with a CSI reporting module 1345-b that may perform CSI reporting functions or aspects of the UE 115-f, such as described above. The processor 1580 may perform frame formatting according to a current TDD UL/DL configuration, and may thus flexibly configure the TDD UL/DL frame structure based on the current UL/DL configuration of the base station 105-e.

On the uplink (UL), at the UE 115-f, a transmit processor 1564 may receive and process data from a data source. The transmit processor 1564 may also generate reference symbols for a reference signal. The symbols from the transmit processor 1564 may be precoded by a transmit MIMO processor 1566 if applicable, further processed by the modulator/demodulators 1554-a through 1554-n (e.g., for SC-FDMA, etc.), and be transmitted to the base station 105-e in accordance with the transmission parameters received from the base station 105-e. At the base station 105-e, the UL signals from the UE 115-f may be received by the antennas 1534, processed by the modulator/demodulators 1532, detected by a MIMO detector 1536 if applicable, and further processed by a receive processor 1538. The receive processor 1538 may provide decoded data to a data output and to the processor 1540. A memory 1542 may be coupled with the processor 1540. The processor 1540 may perform frame formatting according to a current TDD UL/DL configuration. A CSI determination module 1230-a may, in some examples, configure or reconfigure the base station 105-e, or one or more UEs for CSI reporting and/or signaling, as described above. Similarly as discussed above, system 1500 may support operation on multiple component carriers, each of which include waveform signals of different frequencies that are transmitted between base station 105-e and UEs 115-f. Multiple component carriers may carry uplink and downlink transmissions between the UE 115-f and base station 105-e, and base station 105-e may support operation on multiple component carriers that may each have different TDD configurations. In some examples, the TDD UL/DL configuration module 1544 may dynamically reconfigure the TDD UL/DL configuration of base station 105-e carriers according to real-time or near real-time communications through the base station 105-e. The components of the UE 115-f may, individually or collectively, be implemented with one or more Application Specific Integrated Circuits (ASICs) adapted to perform some or all of the applicable functions in hardware. Each of the noted modules may be a means for performing one or more functions related to operation of the system 1500. Similarly, the components of the base station 105-e may, individually or collectively, be implemented with one or more Application Specific Integrated Circuits (ASICs) adapted to perform some or all of the applicable functions in hardware. Each of the noted components may be a means for performing one or more functions related to operation of the system 1500.

Figure 16:
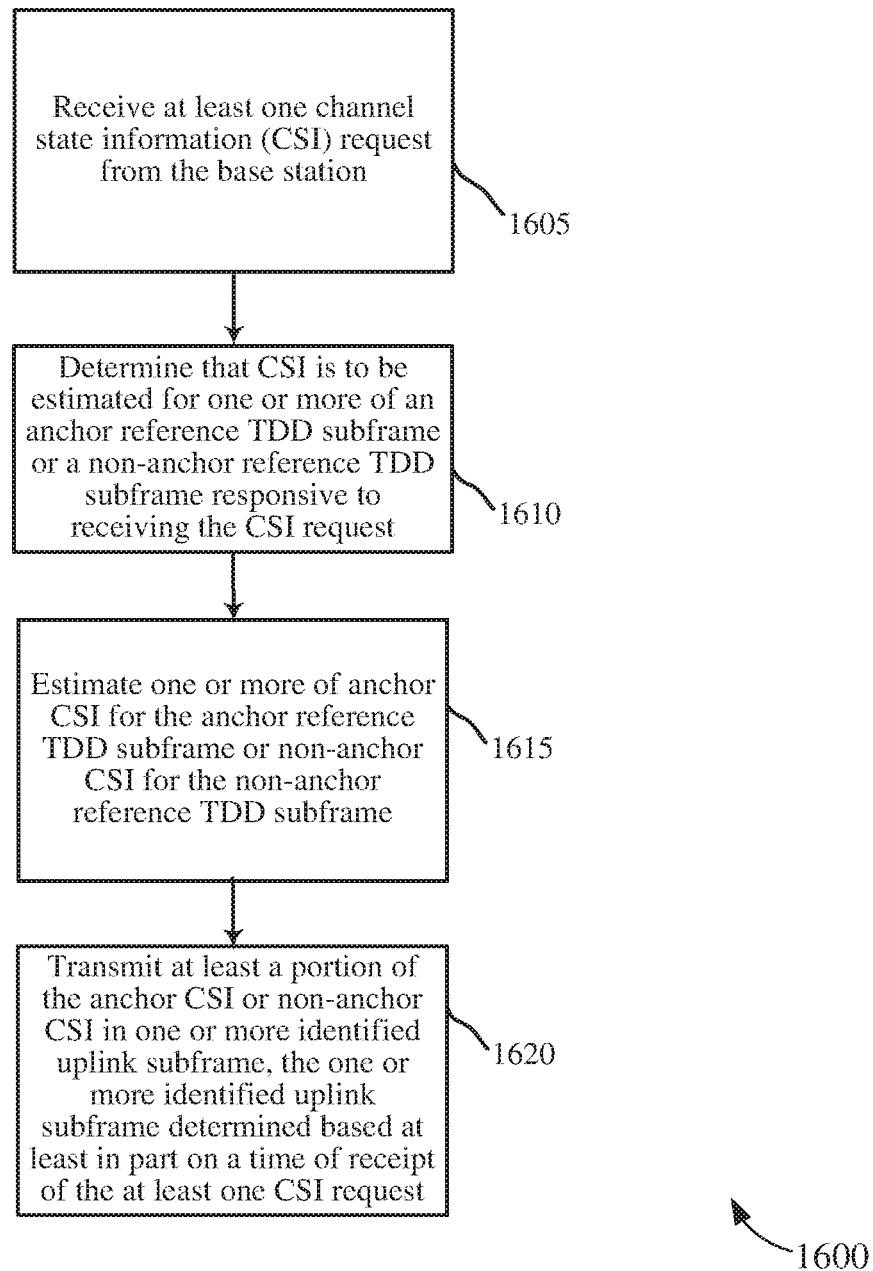
FIG. 16 is a flowchart of a method for estimation and transmission of CSI in accordance with various examples.

FIG. 16 illustrates a method 1600 that may be carried out by a UE in a wireless communications system according to various examples. The method 1600 may, for example, be performed by a UE of FIGS. 1, 3, 12, 13, and/or 15, or device 1105 of FIG. 11, or using any combination of the devices described for these figures. Initially, at block 1605, the UE receives at least one channel state information (CSI) request from the base station. At block 1610, the UE determines that CSI is to be estimated for one or more of an anchor reference TDD subframe or a non-anchor reference TDD subframe responsive to receiving the CSI request. The UE estimates, at block 1615 one or more of anchor CSI for the anchor reference TDD subframe or non-anchor CSI for the non-anchor reference TDD subframe. Finally, at block 1620, the UE transmits at least a portion of the anchor CSI or non-anchor CSI in one or more identified uplink subframes, the one or more identified uplink subframes determined based at least in part on a time of receipt of the at least one CSI request.

Figure 17:
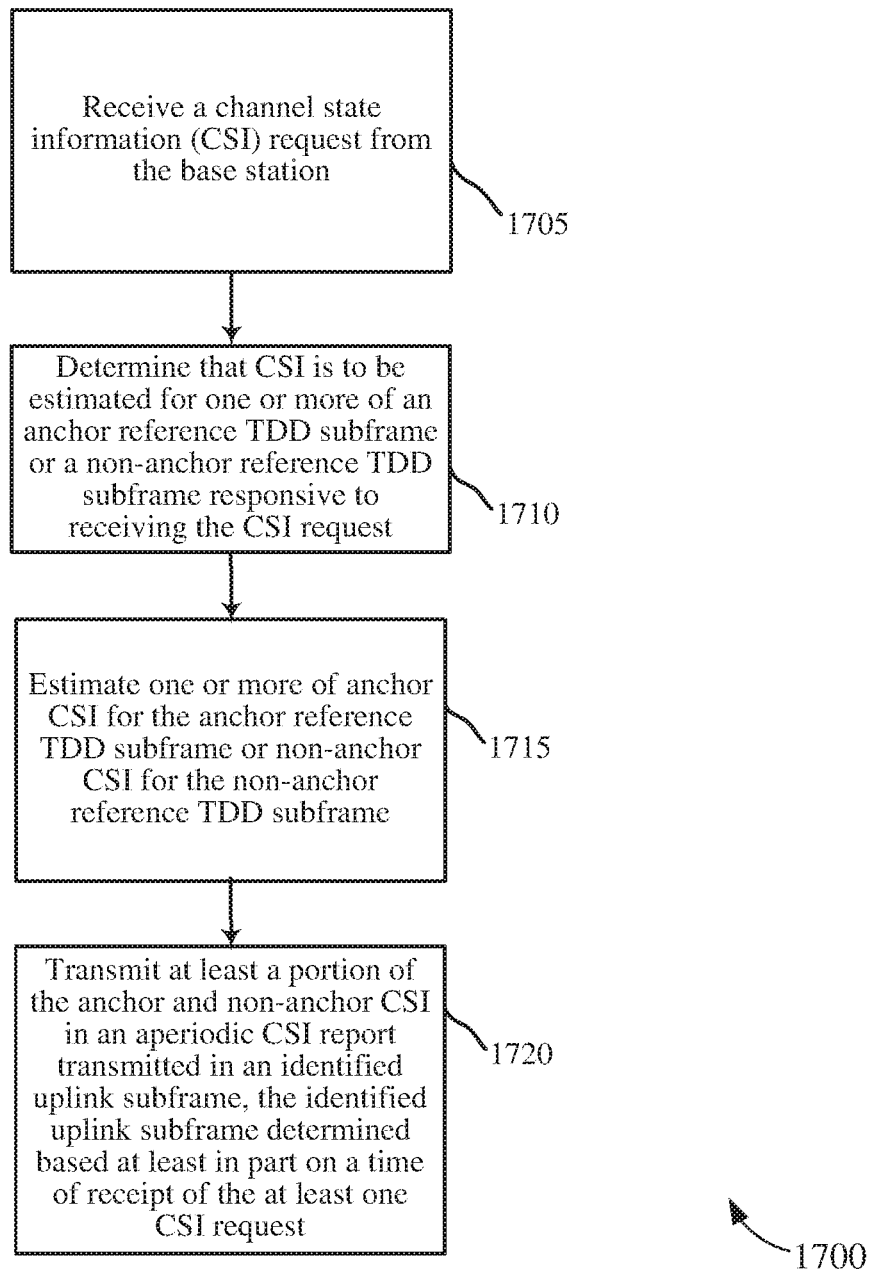
FIG. 17 is a flowchart of another method for estimation and transmission of CSI in accordance with various examples.

FIG. 17 illustrates a method 1700 that may be carried out by a UE in a wireless communications system according to various examples. The method 1700 may, for example, be performed by a UE of FIGS. 1, 3, 12, 13, and/or 15, or device 1105 of FIG. 11, or using any combination of the devices described for these figures. Initially, at block 1705, the UE receives a channel state information (CSI) request from the base station. At block 1710, the UE determines that CSI is to be estimated for one or more of an anchor reference TDD subframe or a non-anchor reference TDD subframe responsive to receiving the CSI request. The UE estimates, at block 1715 one or more of anchor CSI for the anchor reference TDD subframe or non-anchor CSI for the non-anchor reference TDD subframe. Finally, at block 1720, the UE transmits at least a portion of the anchor and non-anchor CSI in an aperiodic CSI report transmitted in an identified uplink subframe, the identified uplink subframe determined based at least in part on a time of receipt of the at least one CSI request.

Figure 18:
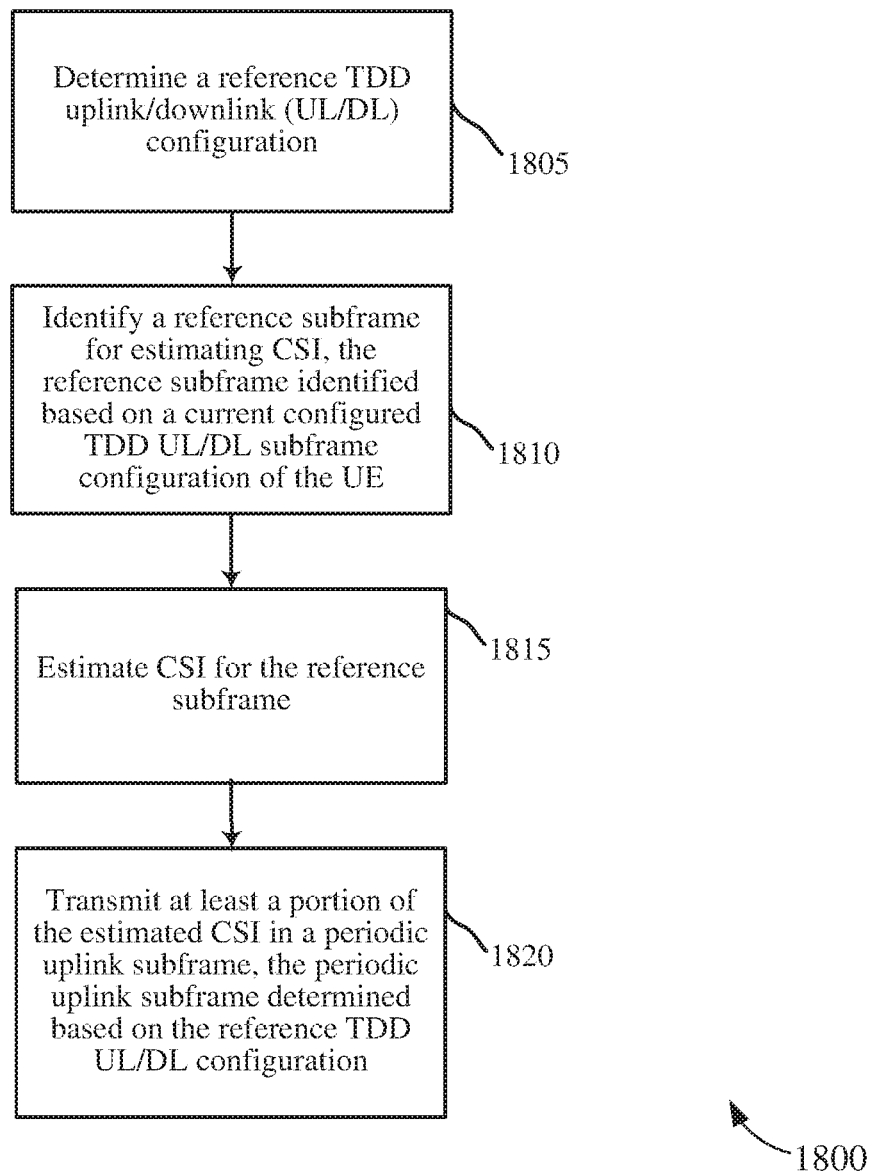
FIG. 18 is a flowchart of another method for estimation and transmission of CSI in accordance with various examples.

FIG. 18 illustrates a method 1800 that may be carried out by a UE in a wireless communications system according to various examples. The method 1800 may, for example, be performed by a UE of FIGS. 1, 3, 12, 13, and/or 15, or device 1105 of FIG. 11, or using any combination of the devices described for these figures. Initially, at block 1805, the UE determines a reference TDD uplink/downlink (UL/DL) configuration. At block 1810, the UE identifies a reference subframe for estimating channel state information (CSI), the reference subframe identified based on a current configured TDD UL/DL subframe configuration of the UE. At block 1815, the UE estimates CSI for the reference subframe. Finally, at block 1820, the UE transmits at least a portion of the estimated CSI in a periodic uplink subframe, the periodic uplink subframe determined based on the reference TDD UL/DL configuration.

The detailed description set forth above in connection with the appended drawings describes exemplary examples and does not represent the only examples that may be implemented or that are within the scope of the claims. The term "exemplary" used throughout this description means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the spirit or scope of the disclosure. Throughout this disclosure the term "example" or "exemplary" indicates an example or instance and does not imply or require any preference for the noted example. Thus, the disclosure is not to be limited to the examples and designs described herein but is to be accorded the widest scope consistent with the principles and novel features disclosed herein.

What is claimed is:

1. A method of wireless communication performed by a user equipment (UE) in time-division duplex (TDD) communication with a base station, comprising:

receiving a channel state information (CSI) request from the base station;

determining, based at least in part on receiving the CSI request, that CSI is to be estimated for an anchor reference TDD subframe, or a non-anchor reference TDD subframe, or a combination thereof, wherein, for a TDD frame structure associated with a plurality of TDD UL/DL configurations, non-anchor subframes are associated with a subframe number of the TDD frame structure having both uplink and downlink configurations, and anchor subframes are associated with a subframe number of the TDD frame structure not having both uplink and downlink configurations;

estimating CSI based at least in part on the determining, wherein the estimating CSI comprises estimating an anchor CSI for the determined anchor reference TDD subframe, or estimating a non-anchor CSI for the determined non-anchor reference TDD subframe, or a combination thereof; and transmitting at least a portion of the estimated CSI in an identified uplink subframe, the identified uplink subframe determined based at least in part on a time of receipt of the CSI request.

2. The method of claim 1, wherein the identified uplink subframe is determined based on a reference TDD UL/DL configuration that is different than a current configured TDD UL/DL configuration of the UE.

3. The method of claim 1, wherein the transmitting comprises:
transmitting estimated anchor CSI in a periodic CSI report; and
transmitting estimated non-anchor CSI in an aperiodic CSI report.

4. The method of claim 1, wherein the transmitting comprises:
transmitting estimated non-anchor CSI in a periodic CSI report; and
transmitting estimated anchor CSI in an aperiodic CSI report.

5. The method of claim 1, wherein the transmitting comprises:
transmitting both estimated non-anchor CSI and estimated anchor CSI in aperiodic CSI reports.

6. The method of claim 3, wherein the periodic CSI report is transmitted in a fixed uplink subframe determined by a reference TDD UL/DL configuration.

7. The method of claim 6, wherein the reference TDD UL/DL configuration is received via Layer I (L1) signaling, Medium Access Control (MAC) signaling, or Radio Resource Control (RRC) signaling.

8. The method of claim 6, further comprising:
determining that an uplink subframe for reporting the periodic CSI report and the aperiodic CSI report correspond to the same uplink subframe; and
multiplexing the periodic CSI report and the aperiodic CSI report in the same uplink subframe.

9. The method of claim 6, further comprising:
determining that an uplink subframe for reporting the periodic CSI report and the aperiodic CSI report correspond to the same uplink subframe; and
transmitting the aperiodic CSI report in the same uplink subframe.

10. The method of claim 3, wherein the non-anchor reference TDD subframe is determined based on a downlink trigger subframe containing the CSI request and a closest subsequent non-anchor downlink subframe that is at least k subframes after the downlink trigger subframe.

11. The method of claim 10, wherein k is greater than or equal to zero.

12. The method of claim 1, further comprising receiving signaling from the base station indicating that the anchor CSI or the non-anchor CSI is to be transmitted, the signaling received via one or more of Layer 1 (L1) signaling, Medium Access Control (MAC) signaling, or Radio Resource Control (RRC) signaling.

13. The method of claim 12, wherein the signaling comprises an enhanced Interference Management and Traffic Adaptation (eIMTA) CSI type field received via L1 signaling.

14. The method of claim 12, wherein the signaling comprises a two-bit CSI request field received in a downlink control information (DCI) transmission.

15. The method of claim 1, wherein the determining that CSI is to be estimated for an anchor subframe, a non-anchor subframe, or a combination thereof, is based on a current frame index.

16. The method of claim 15, wherein estimated anchor CSI and estimated non-anchor CSI are reported in alternating frames.

17. The method of claim 1, wherein the identified uplink subframe is determined based on a reference TDD uplink/downlink (UL/DL) configuration.

18. The method of claim 17, wherein the identified uplink subframe is determined based on a downlink trigger subframe containing the CSI request and closest subsequent non-anchor uplink subframe that is at least k subframes after the downlink trigger subframe.

19. The method of claim 18, wherein k is greater than or equal to zero.

20. A user equipment (UE) apparatus configured for time-division duplex (TDD) wireless communication with a base station, comprising:
a processor configured to:
receive a channel state information (CSI) request from the base station;
determine, based at least in part on receiving the CSI request, that CSI is to be estimated for an anchor reference TDD subframe, or a non-anchor reference TDD subframe, or a combination thereof, wherein, for a TDD frame structure associated with a plurality of TDD UL/DL configurations, non-anchor subframes are associated with a subframe number of the TDD frame structure having both uplink and downlink configurations, and anchor subframes are associated with a subframe number of the TDD frame structure not having both uplink and downlink configurations;
estimate CSI based at least in part on the determining, wherein the estimating CSI comprises estimating an anchor CSI for the determined anchor reference TDD subframe, or estimating a non-anchor CSI for the determined non-anchor reference TDD subframe, or a combination thereof; and
transmit at least a portion of the estimated CSI in an identified uplink subframe, the identified uplink subframe determined based at least in part on a time of receipt of the CSI request; and
a memory coupled to the processor.

21. A user equipment (UE) apparatus configured for time-division duplex (TDD) wireless communication with a base station, comprising:
means for receiving a channel state information (CSI) request from the base station;
means for determining, based at least in part on receiving the CSI request, that CSI is to be estimated for an anchor reference TDD subframe, or a non-anchor reference TDD subframe, or a combination thereof, wherein, for a TDD frame structure associated with a plurality of TDD UL/DL configurations, non-anchor subframes are associated with a subframe number of the TDD frame structure having both uplink and downlink configurations, and anchor subframes are associated with a subframe number of the TDD frame structure not having both uplink and downlink configurations;
means for estimating CSI based at least in part on the determining, wherein the estimating CSI comprises estimating an anchor CSI for the determined anchor reference TDD subframe, or estimating a non-anchor CSI for the determined non-anchor reference TDD subframe, or a combination thereof; and
means for transmitting at least a portion of the estimated CSI in an identified uplink subframe, the identified uplink subframe determined based at least in part on a time of receipt of the CSI request.

22. The apparatus of claim 21, wherein the identified uplink subframe is determined based on a reference TDD UL/DL configuration that is different from a current configured TDD UL/DL configuration of the UE apparatus.

23. The apparatus of claim 21, wherein the means for transmitting transmits estimated anchor CSI in a periodic CSI report, and transmits estimated non-anchor CSI in an aperiodic CSI report.

24. The apparatus of claim 21, wherein the means for transmitting transmits estimated non-anchor CSI in a periodic CSI report, and transmits estimated anchor CSI in an aperiodic CSI report.

25. The apparatus of claim 21, wherein the means for transmitting transmits both estimated non-anchor CSI and estimated anchor CSI in periodic CSI reports.

26. The apparatus of claim 23, wherein the periodic CSI report is transmitted in a fixed uplink subframe determined by a reference TDD UL/DL configuration.

27. The apparatus of claim 26, further comprising:
means for determining that an uplink subframe for reporting the periodic CSI report and a periodic CSI report correspond to the same uplink subframe; and
means for multiplexing the periodic CSI report and the aperiodic CSI report in the same uplink subframe.

28. The apparatus of claim 23, wherein the non-anchor reference TDD subframe is determined based on a downlink trigger subframe containing the CSI request and a closest subsequent non-anchor downlink subframe following the downlink trigger subframe.

29. The apparatus of claim 21, wherein the anchor CSI or the non-anchor CSI is determined based on a current frame index.

30. A non-transitory computer-readable medium comprising code for time division duplex (TDD) wireless communication by a user equipment (UE), the code comprising instructions executable by a processor to:
receive a channel state information (CSI) request from a base station;
determine, based at least in part on receiving the CSI request, that CSI is to be estimated for an anchor reference TDD subframe, or a non-anchor reference TDD subframe, or a combination thereof wherein, for a TDD frame structure associated with a plurality of TDD UL/DL configurations, non-anchor subframes are associated with a subframe number of the TDD frame structure having both uplink and downlink configurations, and anchor subframes are associated with a subframe number of the TDD frame structure not having both uplink and downlink configurations;
estimate CSI based at least in part on the determining, wherein the estimating CSI comprises estimating an anchor CSI for the determined anchor reference TDD subframe, or estimating a non-anchor CSI for the determined non-anchor reference TDD subframe, or a combination thereof; and
transmitting at least a portion of the estimated CSI in an identified uplink subframe, the identified uplink subframe determined based at least in part on a time of receipt of the CSI request.

* * * * *